United States Patent
Mercier et al.

(10) Patent No.: US 12,448,298 B2
(45) Date of Patent: Oct. 21, 2025

(54) PRODUCTION OF LOW CARBON FOOTPRINT MAGNESIA

(71) Applicant: INSTITUT NATIONAL DE LA RECHERCHE SCIENTIFIQUE, Québec (CA)

(72) Inventors: Guy Mercier, Québec (CA);
Louis-César Pasquier, Québec (CA);
Nassima Kemache, Québec (CA);
Emmanuelle Cecchi, Québec (CA);
Jean-François Blais, Québec (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 51 days.

(21) Appl. No.: 17/849,862

(22) Filed: Jun. 27, 2022

(65) Prior Publication Data
US 2022/0332596 A1    Oct. 20, 2022

Related U.S. Application Data

(63) Continuation of application No. 16/320,579, filed as application No. PCT/CA2017/050875 on Jul. 20, 2017, now Pat. No. 11,401,168.
(Continued)

(51) Int. Cl.
*C01F 5/06*    (2006.01)
*C01B 32/50*   (2017.01)
(Continued)

(52) U.S. Cl.
CPC .................. *C01F 5/06* (2013.01); *C01F 5/02* (2013.01); *C01F 5/24* (2013.01); *C01B 32/50* (2017.08)

(58) Field of Classification Search
None
See application file for complete search history.

(56) References Cited

U.S. PATENT DOCUMENTS 2,328,286 A    8/1943    MacIntire
3,402,017 A    9/1968    Ruiz
(Continued)

FOREIGN PATENT DOCUMENTS

CA    2248474 A1    3/2000
CN    1150123 A     5/1997
(Continued)

OTHER PUBLICATIONS

Dichicco et al. "Serpentinite carbonation for CO2 sequestration in the southern Apennines: preliminary study" Energy Procedia, 76:477-486 (2015).
(Continued)

*Primary Examiner* — Colin W. Slifka
(74) *Attorney, Agent, or Firm* — Myers Bigel, P.A.

(57) ABSTRACT

A process for producing magnesia can include contacting $CO_2$-containing emissions with a magnesium-containing material to produce magnesium carbonate; subjecting the magnesium carbonate to calcination to produce a $CO_2$ by-product and magnesia; and recycling at least a portion of the $CO_2$ by-product for contacting the magnesium-containing material to produce the magnesium carbonate. The magnesium-containing material can include mining residues, such as phyllosilicate or chrysotile mining residue, and the magnesium carbonate produced can include precipitated nesquehonite that is subjected to calcination to produce the magnesia.

19 Claims, 10 Drawing Sheets

Related U.S. Application Data

(60) Provisional application No. 62/367,250, filed on Jul. 27, 2016.

(51) Int. Cl.
*C01F 5/02* (2006.01)
*C01F 5/24* (2006.01)

(56) References Cited

U.S. PATENT DOCUMENTS

| | | |
|---|---|---|
| 4,508,690 A | 4/1985 | Obrist et al. |
| 4,720,375 A | 1/1988 | Ainscow et al. |
| 2015/0030523 A1 | 1/2015 | Mercier et al. |

FOREIGN PATENT DOCUMENTS

| | | | |
|---|---|---|---|
| CN | 101993098 A | | 3/2011 |
| GB | 560600 A | | 4/1944 |
| JP | S60500812 A | | 5/1985 |
| KR | 101049279 B1 | | 7/2011 |
| WO | WO 8300142 A1 * | 1/1983 | ............ C01F 5/06 |
| WO | 8403490 A1 | | 9/1984 |
| WO | 2007069902 A1 | | 6/2007 |
| WO | 2010022468 A1 | | 3/2010 |
| WO | 2013131193 A1 | | 9/2013 |
| WO | 2014009802 A2 | | 1/2014 |
| WO | 2015154196 A1 | | 10/2015 |

OTHER PUBLICATIONS

Dlugogorski et al. "Dehydroxylation of serpentine materials: Implications for mineral carbonation" Renewable and Sustainable Energy Reviews, 31:353-367 (2014).

International Search Report and the Written Opinion of the International Searching Authority corresponding to International Patent Application No. PCT/CA2017/050875 (14 pages) (mailed Oct. 5, 2017).

Nagamori et al. "The activation of magnesia in serpentine by calcination and the chemical utilization of asbestos tailings—a review" CIM Bulletin, 73(824):144-156 (1980) (Abstract only).

* cited by examiner

PRODUCTION OF LOW CARBON FOOTPRINT MAGNESIA

TECHNICAL FIELD

The technical field generally relates to the production of magnesia from magnesium carbonates, and more particularly to integrating magnesia production with carbon dioxide sequestration and use of ultramafic rocks containing magnesium, such as serpentinite.

BACKGROUND

Magnesia (MgO) is the most prevalent primary material used in the refractory sector. It is conventionally produced by calcination of magnesite ($MgCO_3$) derived from natural deposits or precipitation from brines. The calcination route is by-far the most used, although it results in various environmental challenges.

$CO_2$ generation from the decarbonisation performed during magnesia production and the associated energy requirements are problematic. While energy efficiency and the use of alternative sources can reduce $CO_2$ emissions, more than 50% of the process emissions come from the process itself.

Natural magnesite deposits around the planet are large natural reservoir of $CO_2$ permanently captured and safely stored based on natural geologic processes that occur over thousands of years. Such materials are unfortunately also the major source of MgO production, used in various industries, which results in returning this $CO_2$ back into the atmosphere and thus contributing to global warming.

There is a need for technologies that overcome at least some of the disadvantages of known magnesia production methods.

SUMMARY

In some implementations, there is provided a process for producing magnesia, comprising contacting $CO_2$-containing emissions with a magnesium-containing material to produce magnesium carbonate; subjecting the magnesium carbonate to calcination to produce a $CO_2$ by-product and magnesia; and recycling at least a portion of the $CO_2$ by-product for contacting the magnesium-containing material to produce the magnesium carbonate.

In some implementations, the step of contacting further comprises providing the magnesium-containing material in an aqueous slurry and contacting the $CO_2$-containing emissions and the $CO_2$ by-product with the aqueous slurry.

In some implementations, the process includes: in the contacting step, producing a carbonate loaded slurry comprising precipitable carbonates and substantially free of precipitated alkaline earth metal carbonates; separating the carbonate loaded slurry into an aqueous phase comprising the precipitable carbonates and a solid phase; precipitating the magnesium carbonates from the aqueous phase; and separating the magnesium carbonates from the aqueous phase.

In some implementations, the $CO_2$-containing emissions comprise combustion gas from the magnesia production facility. In some implementations, combustion gas is derived from the calcination step. The combustion gas may be derived from a heat activation step of the magnesium-containing material prior to contacting with the $CO_2$-containing emissions. In some implementations, the $CO_2$ used to contact the magnesium-containing material is exclusively obtained from the magnesia production facility.

In some implementations, the $CO_2$-containing emissions comprise emissions from a separate emission source.

In some implementations, the process includes subjecting the magnesium-containing material to heat activation pre-treatment prior to contacting with the $CO_2$-containing emissions. In some implementations, the heat activation pre-treatment is performed at a temperature from approximately 600 to 700 degrees Celsius. In some implementations, the heat activation pre-treatment is performed for a duration of approximately 20 to 60 minutes. In some implementations, $CO_2$ derived from the heat activation pre-treatment is supplied to the contacting step.

In some implementations, the magnesium-containing material is contacted with a $CO_2$ feed stream that includes a plurality of $CO_2$ source streams. The process may also include controlling the relative quantity of each $CO_2$ source stream in the $CO_2$ feed stream. The controlling may be performed according to pressure, temperature and/or composition of the $CO_2$ source streams. In some implementations, the $CO_2$ feed stream further comprises $CO_2$ derived from an additional magnesia production train. In some implementations, the additional magnesia production train comprises a conventional production train.

In some implementations, the magnesium-containing material comprises serpentine or is derived from serpentinite or variants thereof. In some implementations, the magnesium-containing material is derived from naturally occurring mineral materials. In some implementations, the magnesium-containing material is derived from at least one of basalt, peridotite, serpentinized peridotite, ophiolitic rock, mafic rock, ultramafic rocks, peridot, pyroxene, olivine, serpentine, magnesium oxide containing minerals, and/or brucite.

In some implementations, the magnesium-containing material is pre-treated to produce magnesium-containing particulate material prior to carbonation, and the magnesium-containing particulate material has a magnesium content between about 1 wt % and about 35 wt %. In some implementations, the magnesium content is between about 10 wt % and about 30 wt %.

In some implementations, the magnesium-containing material is derived from industrial by-product material. The industrial by-product material may include steelmaking slag and/or steelmaking worn magnesium oxide brick.

In some implementations, the magnesium-containing material is derived from mining residue. The mining residue may include phyllosilicate mining residue and/or chrysotile mining residue.

In some implementations, the contacting step comprises contacting the $CO_2$ with the magnesium-containing material in a substantially dry form in at least one carbonation unit at a carbonation temperature between about 200° C. and about 500° C. and a carbonation pressure between about 1 bar and about 20 bars, for carbonation thereof to produce magnesium carbonates and a $CO_2$ depleted gas.

In some implementations, the process includes subjecting the magnesium-containing material to size reduction and removal of a magnetic fraction prior to carbonation.

In some implementations, the process includes grinding a starting material to provide a particle size between about 200 microns and about 1000 microns to produce a sized material; removing the magnetic fraction from the sized material to produce a non-magnetic fraction; and grinding the non-magnetic fraction to produce the magnesium-containing material having a particle size of at most 75 microns.

In some implementations, the calcination is conducted in an indirect-heating calcination unit. The calcination may be conducted in a direct-heating calcination unit.

In some implementations, the process includes controlling at least one property of the $CO_2$-containing gas contacted with the magnesium-containing material. The controlling may include regulating the relative quantities of the $CO_2$-containing emissions and the $CO_2$ by-product are used to contact the magnesium-containing material. The controlling may be performed to control gas pressure, gas temperature and/or $CO_2$ content of the $CO_2$-containing gas contacted with the magnesium-containing material.

In some implementations, the process described above includes one or more features of any one of the magnesium carbonate production methods as described herein.

In some implementations, there is provided a process for producing magnesia, comprising: contacting a $CO_2$-containing gas with a magnesium-containing material to produce magnesium carbonate; subjecting the magnesium carbonate to calcination to produce a $CO_2$ by-product and magnesia; and recycling at least a portion of the $CO_2$ by-product as at least part of the $CO_2$-containing gas for contacting the magnesium-containing material to produce the magnesium carbonate. Such a process can include one or more features as described above or herein.

In some implementations, there is provided a process for producing magnesia, comprising: contacting a $CO_2$-containing gas with a magnesium-containing material in an aqueous slurry; recovering precipitated magnesium carbonate from the aqueous slurry; and subjecting the precipitated magnesium carbonate to calcination to produce a $CO_2$ by-product and magnesia. Such a process can include one or more features as described above or herein.

In some implementations, the magnesium carbonate comprises or consists of nesquehonite.

In some implementations, there is provided a magnesia production system, comprising:

at least one carbonation unit having:
  a gas inlet for receiving the $CO_2$ containing gas,
  a slurry inlet for receiving an aqueous slurry comprising an magnesium-containing material,
  a carbonation vessel for the carbonation of at least a portion of the magnesium of the aqueous slurry with $CO_2$ to produce a $CO_2$ depleted gas and a carbonate loaded slurry comprising precipitable magnesium carbonates,
  a slurry outlet for releasing the carbonate loaded slurry comprising precipitable magnesium carbonates, and
  a gas outlet for releasing the $CO_2$ depleted gas;
a separation unit having:
  a slurry inlet for receiving the carbonate loaded slurry comprising precipitable magnesium carbonates from the slurry outlet of the at least one carbonation unit,
  a separation chamber for separation of the carbonate loaded slurry comprising precipitable magnesium carbonates into a solid phase and an aqueous phase comprising the precipitable magnesium carbonates, and
  a liquid outlet for releasing the aqueous phase, and
a precipitation unit having:
  a slurry inlet for receiving the aqueous phase comprising the precipitable magnesium carbonates from the liquid outlet of the separation unit,
  a precipitation chamber for precipitation of the magnesium carbonates and formation of a precipitation slurry, and
  a liquid outlet for releasing the precipitation slurry;

a calcination unit for receiving at least a portion of the magnesium carbonates, producing a calcined magnesia material and a $CO_2$ by-product stream.

In some implementations, the system includes a $CO_2$ collection and supply system for collecting the $CO_2$ by-product stream as supplying the same as at least part of the $CO_2$ containing gas to the carbonation unit.

In some implementations, the system includes at least one additional feature as described or illustrated herein.

In some implementations, there is provided a use of a phyllosilicate mining residue to sequestrate carbon dioxide from industrial emissions and produce magnesia.

In some implementations, there is provided a use of precipitated magnesium carbonate derived from sequestration of $CO_2$ emissions by a magnesium-containing material for production of magnesia via calcination.

In some implementations, there is provided a use of precipitated nesquehonite for production of magnesia via calcination.

In some implementations, there is provided method of producing magnesia comprises supplying magnesium carbonate consisting of precipitated nesquehonite to a calcination unit and calcining the precipitated nesquehonite to produce magnesia.

In some implementations, there is provided a magnesia product produced by calcination of a precipitated magnesium carbonate derived from contacting a magnesium-containing material in wet or dry form with carbon dioxide from industrial emissions in a carbonation unit to form a carbonate loaded slurry, and precipitating the calcium or magnesium carbonate from the carbonate loaded slurry in a precipitation unit.

In some implementations, the precipitated magnesium carbonate consists of nesquehonite.

In some implementations, the process includes recovering a $CO_2$-containing by-product stream from calcination; and subjecting the $CO_2$-containing by-product to water removal to produce a treated $CO_2$ by-product stream prior to contacting the treated $CO_2$ by-product stream with the magnesium-containing material.

In some implementations, the magnesium-containing material comprises an evaporite. In some implementations, the evaporite is derived from an evaporator unit. In some implementations, the evaporite comprises a magnesium chloride salt. In some implementations, the evaporite comprises a magnesium sulfide salt. In some implementations, the evaporite comprises a magnesium carbonate salt. In some implementations, the evaporite is pre-treated prior to carbonation.

It should be noted that one or more of the features described above or herein can be combined with the processes, systems, uses and/or products as described above or herein.

BRIEF DESCRIPTION OF THE DRAWINGS

Some embodiments, aspects and implementations of the technology are represented in and will be further understood in connection with the following figures.

While the invention will be described in conjunction with example embodiments, it will be understood that it is not intended to limit the scope of the invention to these embodiments. On the contrary, it is intended to cover all alternatives, modifications and equivalents as may be included as defined by the appended claims.

DETAILED DESCRIPTION

Various techniques are described herein for the production of magnesia and utilization of $CO_2$ emissions and by-product streams. In some implementations, the techniques facilitate low carbon dioxide magnesia production from serpentinite carbonation of magnesium-containing materials, such as those derived from serpentinite.

Magnesia Production Overview

Figure 12:
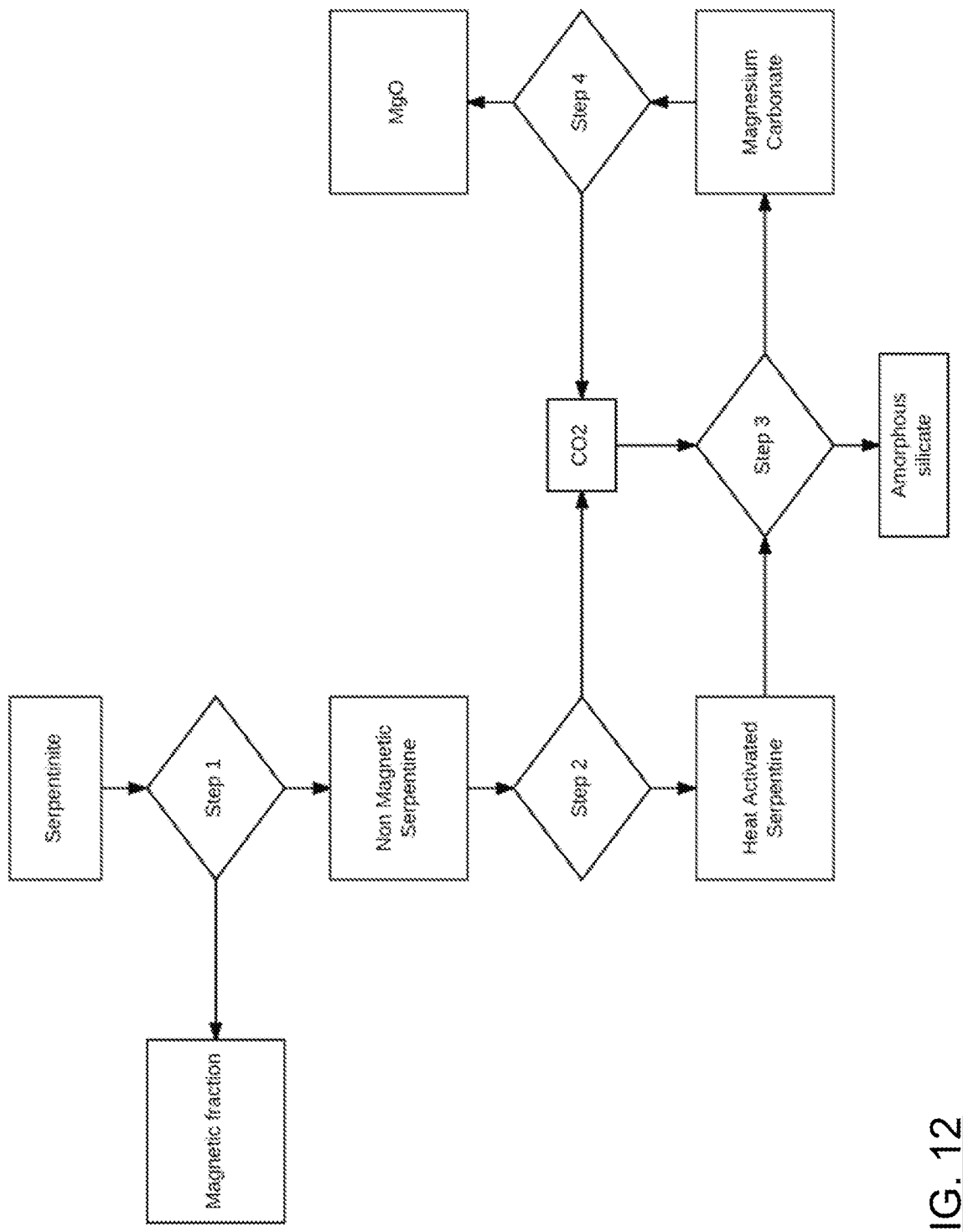
FIG. 12 is a schematic diagram of a method for producing MgO.
Figure 13:
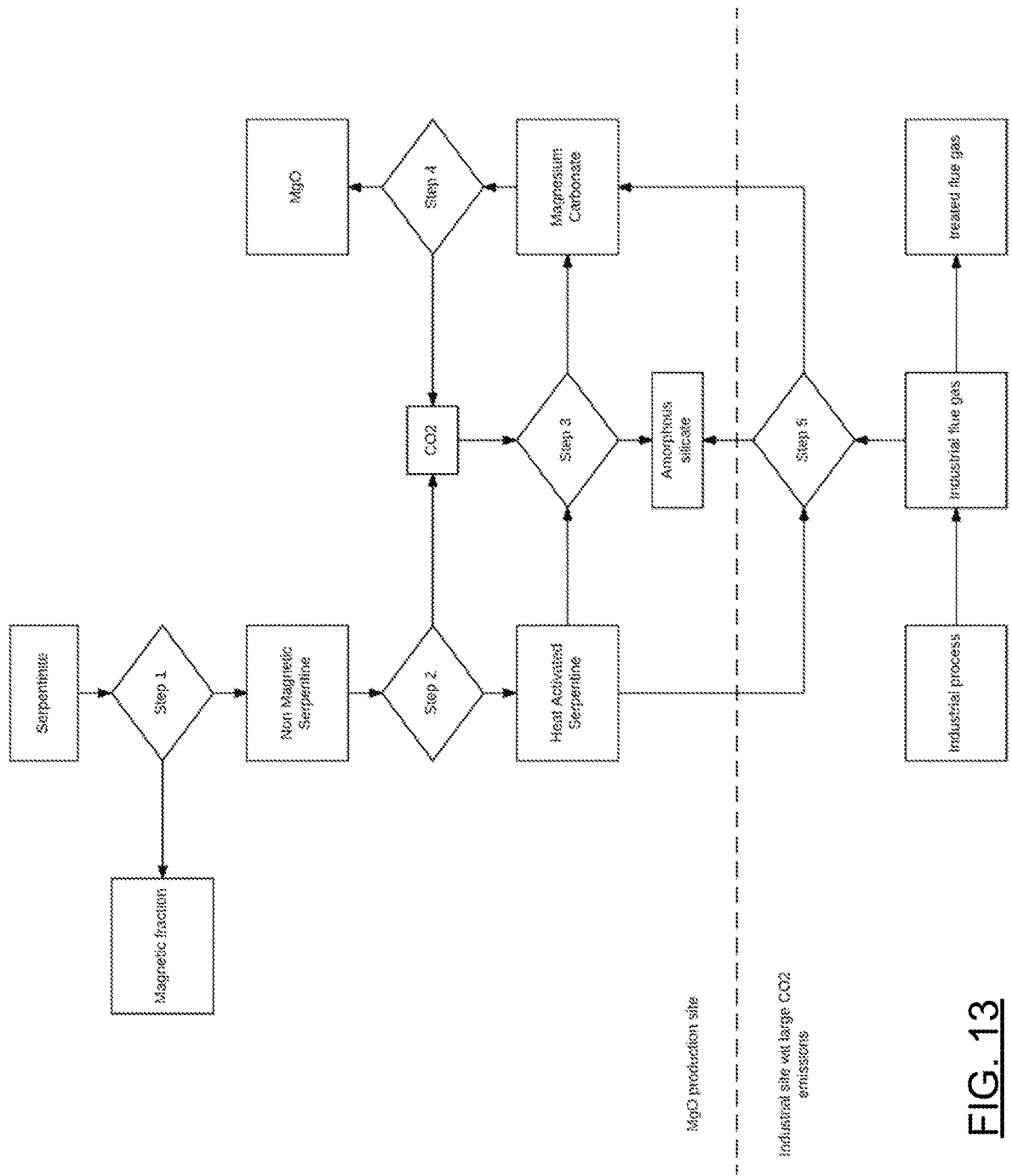
FIG. 13 is a schematic diagram of a method for producing MgO and integrating $CO_2$ emissions capture from another industrial flue gas.

Referring to FIGS. 12 and 13, the overall process is illustrated for converting serpentinite into magnesia. Other magnesium containing materials can also be used.

The serpentinite may be provided from waste or residue or extracted as an ore. Serpentinite carbonation is performed and can include one or more features as described further below, resulting in a relatively high quality magnesium carbonate stream, some examples of which may be referred to herein as nesquehonite, for use in the magnesia production process. It should be noted that various forms of magnesite derived from carbonation of serpentinite or similar magnesium-containing materials can be used as the magnesia production feedstock, including hydrated forms of magnesite such as dypingite ($Mg_5(CO_3)_4(OH)_2 \cdot 5H_2O$), hydromagnesite ($Mg_5(CO_3)_4(OH)_2 \cdot 4H_2O$), other hydrated forms of magnesium carbonate hydrated, and combinations thereof.

The nesquehonite or other magnesite materials provided by the carbonation operation can be used as a feedstock for magnesia production by calcination. Calcination results in the generation of $CO_2$ by-product, which can be used in whole or in part to produce further magnesite (e.g., nesquehonite) and then magnesia.

The $CO_2$ used in the carbonation step can be derived from a separate industrial process, from the magnesia production process as $CO_2$-containing emissions (e.g., from combustion of hydrocarbons), and/or from at least a portion of the $CO_2$ by-product stream from the calcination step. The carbonation step can be conducted at the magnesia production site, particularly when the $CO_2$ used for carbonation is exclusively from the magnesia production site. Alternatively, the carbonation step can be conducted off-site at an industrial emitter, particularly when the $CO_2$ used for carbonation is from the emitter.

Magnesia end-products can vary depending on the desired characteristics and processing conditions, which can be obtained by adjusting calcination parameters such as calcination time and temperature.

Referring to FIG. 12, during the step 1, serpentinite can be crushed and ground in order to reach a particle size of approximatively 200 μm-1000 μm, 300-700 μm, 400-600 μm, or approximatively 500 μm. The magnetic fraction can then then removed by physical treatment(s). Various magnetic separation techniques can be used. The magnetic fraction is mainly composed of hematite/magnetite/chromite and represents a value-added product which can be further treated and sold. The non-magnetic fraction can be subjected to further size-reduction to obtain a magnesium-containing particulate material having a particle size of at most 75 μm, at most 50 μm, at most 40 μm, or at most 30 μm. The second size-reduction step enhances the subsequent carbonation step.

In step 2, the non-magnetic serpentinite is heat activated. The heat activation can be performed at a temperature of approximatively 600-700° C. for approximatively 20-60 minutes. The $CO_2$ emissions associated with the heat activation can be collected to be used in step 3.

The heat activated serpentinite is then used as the feedstock for the carbonation step (step 3). Here the heat activated serpentinite is reacted with $CO_2$ streams, which may be gas streams coming from both step 2 and step 4 in some scenarios. The $CO_2$ gas composition can vary, for example, from 5% to 30%. Depending on the stage of the process (e.g., start-up, steady state, turn-down, etc.) the $CO_2$ content in the gas that is fed to the carbonation unit may vary. For example, during start-up the $CO_2$ content may correspond with combustion gas contents of around 5% to 7%, for example, whereas during steady-state operations the $CO_2$ content may correspond with a mixture of $CO_2$ gas sources that includes both combustion gas and recycled $CO_2$ by-product gas and may thus be higher in the range of 25% to 30%. It should also be noted that in some scenarios, the $CO_2$ gas content may be much higher, e.g., in the range of 50% to 100%, in the event that relatively pure $CO_2$ is used which may be the case for certain scenarios which will be further discussed below.

Still referring to step 3, the first by-product material of step 3 is an amorphous silicate phase that can be used as a filling material. The second product of step 3 is magnesium carbonate that can be supplied to subsequent treatment.

In step 4, the magnesium carbonate is subjected to calcination to produce magnesia. In some implementations, all of the $CO_2$ by-product emissions from the calcination are deviated to be fed into step 3.

Turning now to FIG. 13, low $CO_2$ magnesia production can be associated with a $CO_2$ capture plant on an industrial site. In this case, a second carbonation site (step 5) is added to the scenario previously discussed. By following this approach, the magnesia production can be increased and $CO_2$ emissions from another industrial plant can be reduced.

In some implementations, the methodology facilitates production of low carbon magnesia, obtained from magnesium-containing materials, such as serpentine ($Mg_3Si_2O_5$ (OH)$_4$) based rocks. The $CO_2$ is transformed into carbonates when reacting with the magnesium contained within the mineral structure. Following recent research, a process using serpentinite was developed to treat industrial flue gas, facilitating economically cutting $CO_2$ emissions as well as producing nesquehonite with a very high degree of purity degree. In turn, such nesquehonite can be used as a feedstock for further treatment in order to advantageously produce magnesia by calcination. In addition, both carbonation of serpentinite and decarbonisation of magnesite could be conducted at a single industrial site, to offset $CO_2$ emissions issued from the magnesite roasting. The result is a magnesia production operation where $CO_2$ is recycled in a cyclical process and not released into the atmosphere, giving a low carbon footprint and a high-purity magnesia product.

In one aspect, techniques described herein can facilitate producing magnesia without high $CO_2$ emissions to the atmosphere when using natural magnesite deposit as feedstock. In another aspect, techniques described herein can facilitate integration of $CO_2$ emissions from the magnesite calcination to produce more magnesia from serpentinite carbonation. In another aspect, techniques described herein can facilitate production of magnesia from magnesite that has been produced by serpentinite carbonation using industrial $CO_2$ emitted from another industrial site.

Figure 14:
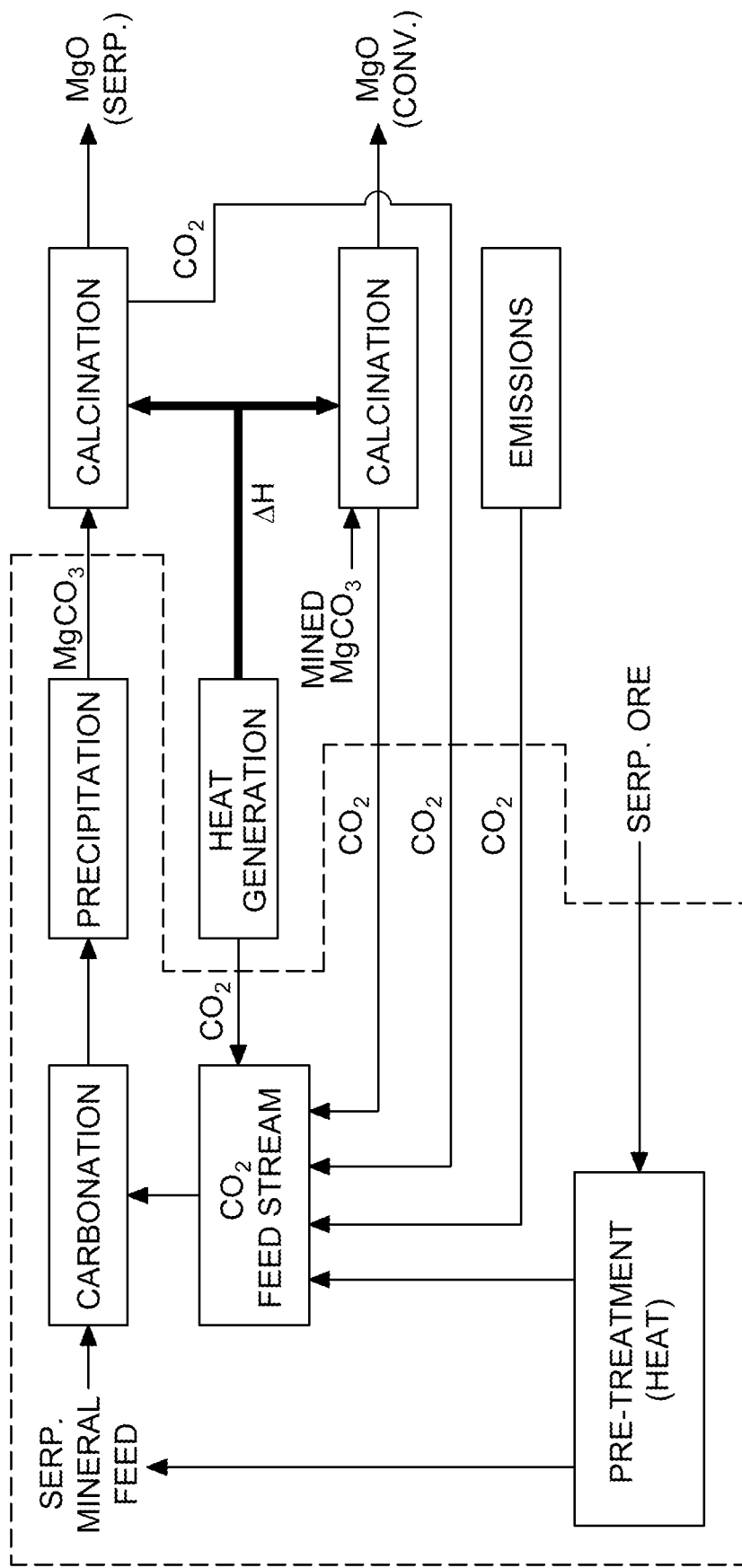
FIG. 14 is a process diagram illustrating a two-train MgO production operation which may be applicable to a potential retrofit for an existing MgO production facility, for example.

Referring to FIG. 14, it should be noted that a magnesia production facility can include two or more trains which each produce an MgO output stream. In FIG. 14 there are two trains, one of which is a conventional train that receives a feed of magnesite from natural deposits for calcination, and a second train that can be new or retrofitted as illustrated to include serpentine or similar material as a feedstock for carbonation-precipitation and the resulting $MgCO_3$ is fed to calcination to produce serpentine-derived MgO. Various $CO_2$ streams are produced in such a multi-train process, and it should be noted that one or more of the $CO_2$ streams can be used in the carbonation step.

The $CO_2$ streams can be collected by a $CO_2$ collection system, which may include piping, compressors (as needed, depending on pressure conditions), vessels, valves, condensers, particle filters, heat exchanger(s) for heating or cooling the gas, and/or a control unit. Depending on the availability and properties (e.g., pressure, temperature, $CO_2$ content) of the different $CO_2$-containing streams, the collection system and the input of $CO_2$ feed to the carbonation unit can be regulated. The $CO_2$ collection and supply system can also be a relatively simple assembly that fluidly connects the calcination unit's gas outlet to the carbonation unit's gas inlet. In some scenarios, CO2-containing gas is directly supplied to the carbonation unit without any substantial intervening units; in such scenarios the operating conditions of the calcination and carbonation units can be provided to facilitate direct $CO_2$ supply between the two units. In addition, when there is an overabundance of potential $CO_2$, there may be storage units that retain $CO_2$ from one or more selected sources.

The $CO_2$ collection and supply system can have various configurations. In some scenarios, the $CO_2$ collection and supply system is gas-tight in order to inhibit $CO_2$ leaks. The $CO_2$ collection and supply system can include collection lines in fluid communication with the calcination unit and a $CO_2$ feed line in fluid communication with the carbonation unit. In addition, there may be one or more compressors and/or heat exchangers as part of the $CO_2$ collection and supply system in order to supply the $CO_2$ to the carbonation unit at the desired temperatures and pressures.

In some implementations, the calcination unit is either a direct-heated calcination unit or an indirect-heated calcination unit. For direct-heated calcination, the resulting $CO_2$-containing by-product stream is a mixed gas stream that includes $CO_2$ from both the decarbonisation of magnesite and the combustion of fuel as well as other gas components. The $CO_2$ by-product stream from direct-heated calcination unit can have a $CO_2$ content that is higher than combustion emissions, and can thus be favored over $CO_2$ emissions for feeding into the carbonation unit. For indirect-heated calcination, the $CO_2$-containing by-product stream is predominantly $CO_2$ from the decarbonisation of magnesite, and due to its high $CO_2$ content of up to 100% it can favored over other $CO_2$ streams (e.g., $CO_2$ emissions, $CO_2$-containing by-product stream from direct-heated calcination from another train, etc.) for feeding into the carbonation unit in order to provide a greater driving force for the carbonation reactions and smaller equipment size (e.g., vessel, pipes, etc.).

Furthermore, the $CO_2$-containing stream that is used in the carbonation unit can be selected based on higher pressures in order to promote the carbonation reaction. $CO_2$ streams from combustion emission sources may have relatively low pressures, whereas $CO_2$ stream from calcination may have higher pressures and thus can be selectively used for the carbonation step. For example, as the process goes from start-up to normal operations, an increasing amount of $CO_2$ from calcination can be used for carbonation.

In some implementations, the magnesium carbonate feedstock that is supplied to calcination consists of nesquehonite that has been obtained from carbonation-precipitation method described herein. By providing nesquehonite having a pre-determined hydration state to calcination, the control and handling during the calcination step can be improved. For example, when nesquehonite is supplied to the calcination, there can be a pre-determined heat based on the known hydration state of the nesquehonite, whereas magnesium carbonate derived from natural deposits may include a complex mixture of hydrated materials for which the enthalpy of dehydration is difficult to consistently determine.

Optional Techniques for $CO_2$ Sequestration for Magnesium Carbonate Production and Integration with Magnesia Production Various optional techniques can be used in conjunction with the above magnesia production implementations in order to sequester carbon dioxide and produce alkaline earth metal carbonates for use in magnesia production.

In one aspect, in combination with the MgO production process, there is provided a method for chemically sequestering carbon dioxide from a carbon dioxide containing gas by producing alkaline earth metal carbonates. The carbon dioxide containing gas may be issued from industrial emissions and have various carbon dioxide concentrations according to the industrial process from which the emissions are derived.

In some optional aspects, in combination with the MgO production process, there is provided a method for carbon dioxide chemical sequestration from industrial emissions that contain carbon dioxide by carbonation using magnesium or calcium silicate, preferably magnesium silicate or other magnesium-containing materials to provide a source of magnesium. In some aspects, an analogous production process for producing CaO can be performed by leveraging carbon dioxide chemical sequestration from industrial emissions that contain carbon dioxide by carbonation of calcium-containing materials.

Much of the research up to this juncture has been performed using gases containing 100% $CO_2$, which implies that carbon dioxide from the chimney of an industrial facility must first be concentrated using separate technologies before it can be treated using carbonation. This implies a more costly process. In 2011, a carbon capture and sequestration (CCS) pilot plant opened at a coal fired facility in the United Kingdom. Experts have estimated that 16% to 40% of the energy produced could end up being used to capture and store carbon. This corresponds to a 100 million dollar producing electricity plant to a cost between 16 to 40 million dollars.

Embodiments of the present invention may enable increasing the economic viability by providing profit or a cost between zero to 10% of the value of the produced energy.

In some optional aspects, the carbon dioxide containing gas may advantageously be gas emissions that are directly used as they are produced from a plant. For example, for a cement factory, one may use a gas containing 18.2% $CO_2$, 4.11% $O_2$ and 77.69% $N_2$. Optionally, the carbon dioxide containing gas derived from industrial emissions may have a carbon dioxide concentration between about 1% and about 30%.

Embodiments of the present invention may also enable to produce valuable alkaline earth metal carbonates from an alkaline earth metal containing material.

It should be understood that the alkaline earth metal containing material may be a natural material that may include but is not limited to alkaline earth metal containing minerals and alkaline earth metal containing rocks. For example, the alkaline earth metal containing material may include serpentine or serpentinite. Optionally, the alkaline earth metal containing material may include alkaline earth metal containing rocks such as sandstone, granite, anorthosite, basalt, serpentinite, peridotite, serpentinized peridotite, ophiolitic rocks, mafic and ultramafic rocks (containing Mg and Fe minerals), rocks containing more than 10% of pyroxene and peridot, or a combination thereof. Optionally, the alkaline earth metal containing material may also include a phyllosilicate. Further optionally, the alkaline earth metal containing material may include alkaline earth metal containing minerals such as calcium silicate, magnesium silicate, feldspar, plagioclase feldspar (andesine), peridot (olivine sand), pyroxene (enstatite olivine sand), olivine, serpentine (as in mineral family containing antigorite, chrysotile, lizardite), wollastonite, calcium oxide (CaO), magnesium oxide or periclase (MgO), brucite ($Mg(OH)_2$), mafic and ultramafic minerals (containing Mg and Fe), or a combination thereof.

In some implementations, the magnesium-containing material that is used as a feedstock can include magnesium-containing evaporate. Evaporite is a sedimentary deposit of precipitated minerals formed by the evaporation of aqueous solution. Evaporite materials can, in some cases, include elevated magnesium concentrations. Evaporite can include magnesium-containing particulate material that is in a relatively reactive condition, due in part to its small particle size. The evaporite may be obtained from evaporator units used in various industries. Alternatively, the evaporite may be obtained from natural rocks formed by evaporation of former seas or salt-water lakes. Evaporites may include magnesium in the form of various magnesium salts of chlorides, sulfates and/or carbonates, such as carnallite ($KMgCl3·6H2O$), kainite ($KMg(SO4)Cl·3H2O$), kieserite ($MgSO4·H2O$), langbeinite ($K2Mg2(SO4)3$), polyhalite ($K2Ca2Mg(SO4)6·H2O$) and magnesite ($MgCO3$). Depending on the chemical nature and physical structure of the evaporite material, it can be pre-treated using thermal and/or chemical steps to form a pre-treated magnesium-containing material for use in the carbonation step.

The alkaline earth metal containing material may also be issued from various industrial wastes or residues such as slag, cement waste, mining processing waste and mineral processing waste, which are available without the need to be mined from geological formations. Optionally, the slag may include steelmaking slag, steelmaking worn MgO brick or a combination thereof. Optionally, the cement waste may include rotary kiln dust (CKD, LKD), waste cement, waste concrete, construction and demolition waste, concrete with aggregates, concrete brick, concrete, red brick or a combination thereof. Optionally, the mining and mineral processing waste may include phyllosilicate mining residue, chrysotile mining residue, serpentine (as in the rock matrix containing the ore) or a combination thereof.

Figure 1:
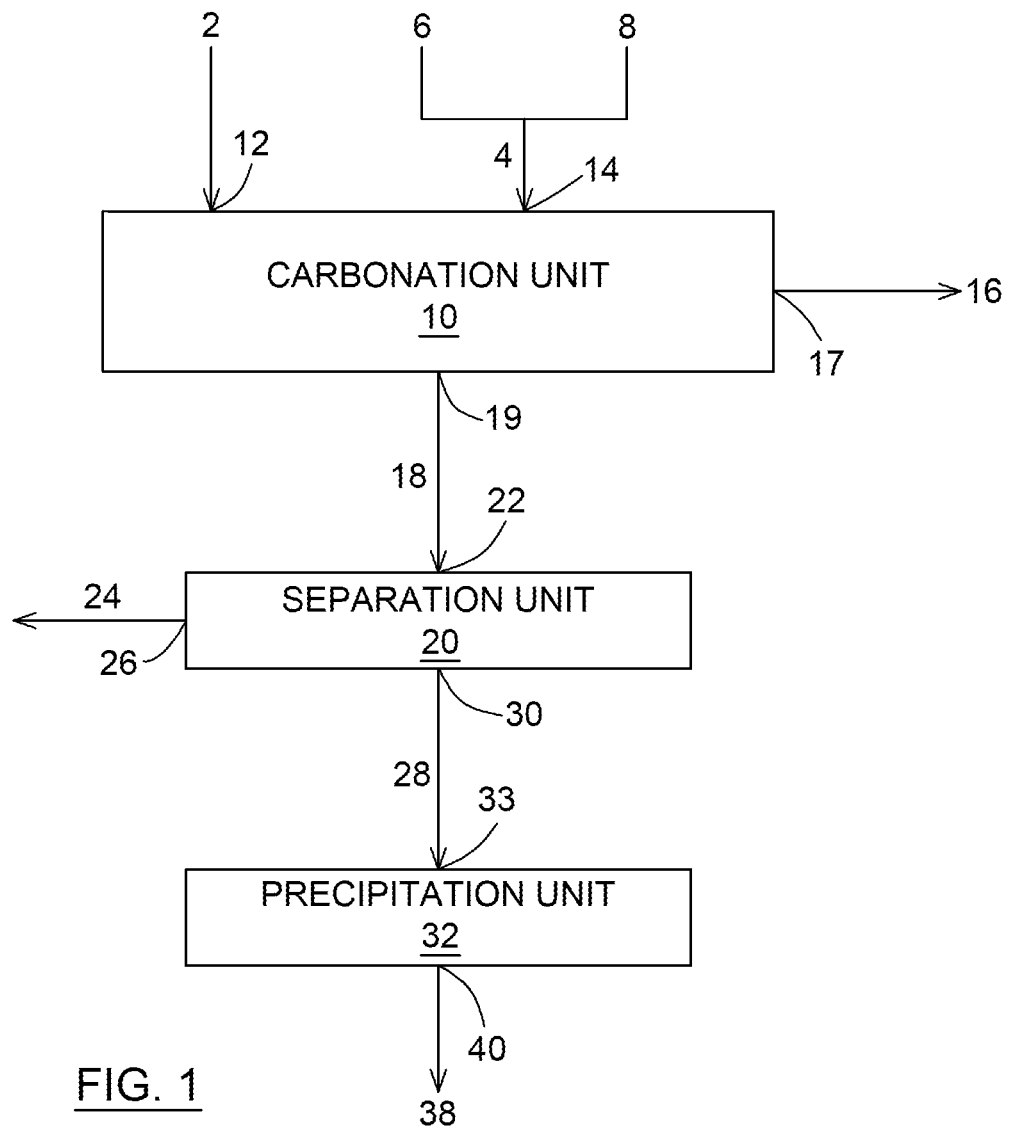
FIG. 1 is a process flow diagram of wet carbonation.

Referring to FIG. 1, in some implementations, the method includes the step of supplying the carbon dioxide containing gas 2 and an aqueous slurry 4 including an alkaline earth metal containing material 6 and water 8 to a carbonation unit 10. The carbonation unit 10 may include a gas inlet 12 for receiving the carbon dioxide containing gas 2 and a slurry inlet 14 for receiving the aqueous slurry 4. The method then includes the step of contacting the carbon dioxide containing gas 2 and the aqueous slurry 4 in the carbonation unit 10, for carbonation of at least a portion of the alkaline earth metal. A carbon dioxide depleted gas 16 and a carbonate partially loaded slurry 18 including precipitable carbonates are produced. The method may also include the step of removing the carbon dioxide depleted gas 16 from the carbonation unit 10 through a gas outlet 17, and the carbonate loaded slurry 18 through a slurry outlet 19. In some implementations, the carbonate loaded slurry contains substantially no precipitated carbonates within and as it is released from the carbonation unit 10. The carbonate loaded slurry 18 is then separated in a separation unit 20 into a solid phase 24 and an aqueous phase 28 including the precipitable carbonates, which are respectively released from the separation unit 20 via a solid outlet 26 and a liquid outlet 30. In some implementations, the aqueous phase 28 contains substantially no precipitated carbonates within and as it is released from the separation unit 20. The aqueous phase 28 may be then supplied to a precipitation unit 32 via a liquid inlet 33. The method may include precipitating at least a portion of the precipitable carbonates of the aqueous phase 28 into alkaline earth metal carbonates in the precipitation unit 32, thereby producing a precipitation slurry 38 including the alkaline earth metal carbonates which is released from the precipitation unit 32 via a slurry outlet 40.

Figure 2:
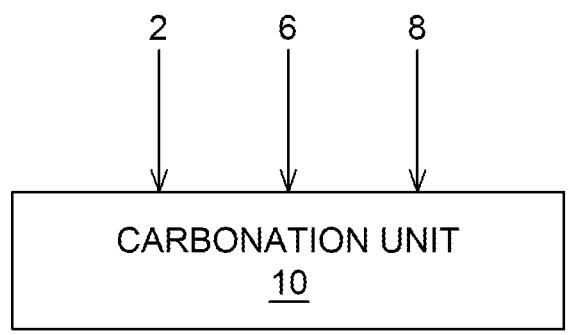
FIG. 2 is a schematic of carbonation unit.

It should be understood that the aqueous slurry 4 including the alkaline earth metal containing material 6 may be formed prior to being supplied to the carbonation unit 10 as seen in FIG. 2, but may also be directly formed in the carbonation unit 10 by supplying separately the alkaline earth metal containing material 6 and water 8 to the carbonation unit 10.

In some optional aspects, the method may further include the step of agitating the aqueous slurry in the carbonation unit to enhance contact between the carbon dioxide containing gas and the alkaline earth metal containing material. The agitation may be ensured by a mechanical agitator such as a propeller having an agitation speed between about 400 rpm and about 800 rpm, optionally between about 500 rpm and about 650 rpm. It should be understood that the agitation step is not limited to a mechanical agitation and may include various known and suitable agitation techniques such as gas fluidisation.

In other optional aspects, the method may also include agitating the aqueous phase in the precipitation unit to enhance precipitation of the alkaline earth metal carbonates.

In some optional aspects, the alkaline earth metal containing material may be mixed with water so as to obtain the aqueous slurry having a pulp density (also referred to as mass concentration of total solids per liter of slurry) between 25 g/L and 300 g/L. A low pulp density may favor the dissolution of the alkaline earth metal in the aqueous slurry. The influence of the density of the aqueous slurry on carbon dioxide removal efficiency is shown in Example 2.

In some optional aspects, the method may include thermally pre-treating the alkaline earth containing material to perform dehydroxylation. The alkaline earth containing material may indeed include undesirable water which is at least partially removed with the thermal pre-treatment. During the thermal pre-treatment, water is vaporized and the crystalline structure of the alkaline earth metal containing material may be changed into a more chemically active structure, allowing better dissolution of the alkaline earth metal in aqueous phase. Optionally, the method may include heating the alkaline earth metal containing material at a pre-treating temperature between about 500° C. and about 800° C. during a pre-treating time between about 10 minutes and about 60 minutes. Optionally, the pre-treating temperature may be between about 600° C. and about 700° C. and the pre-treating time may be between about 15 minutes and about 40 minutes. Optionally, the pre-treating temperature may be sufficiently low to avoid recrystallization of the alkaline earth metal containing material. The influence of the thermal pre-treatment on carbon dioxide removal efficiency is shown in Example 3.

In some optional aspects, the method may include crushing and/or grinding the alkaline earth metal containing material to enhance the available surface for contact with the carbon dioxide containing gas and favor carbonation of the alkaline earth metal. Optionally, the alkaline earth metal containing material may be crushed and/or grinded such that the average size of the material particles is between about 10 μm and about 45 μm and such that at least about 90% of the solid particles having a particle size between about 0 μm and about 75 μm. Optionally, the crushing and/or grinding step may be performed before the thermal pre-treating step as the dehydroxylation may be favored by using material particles of reduced size.

Figure 3:
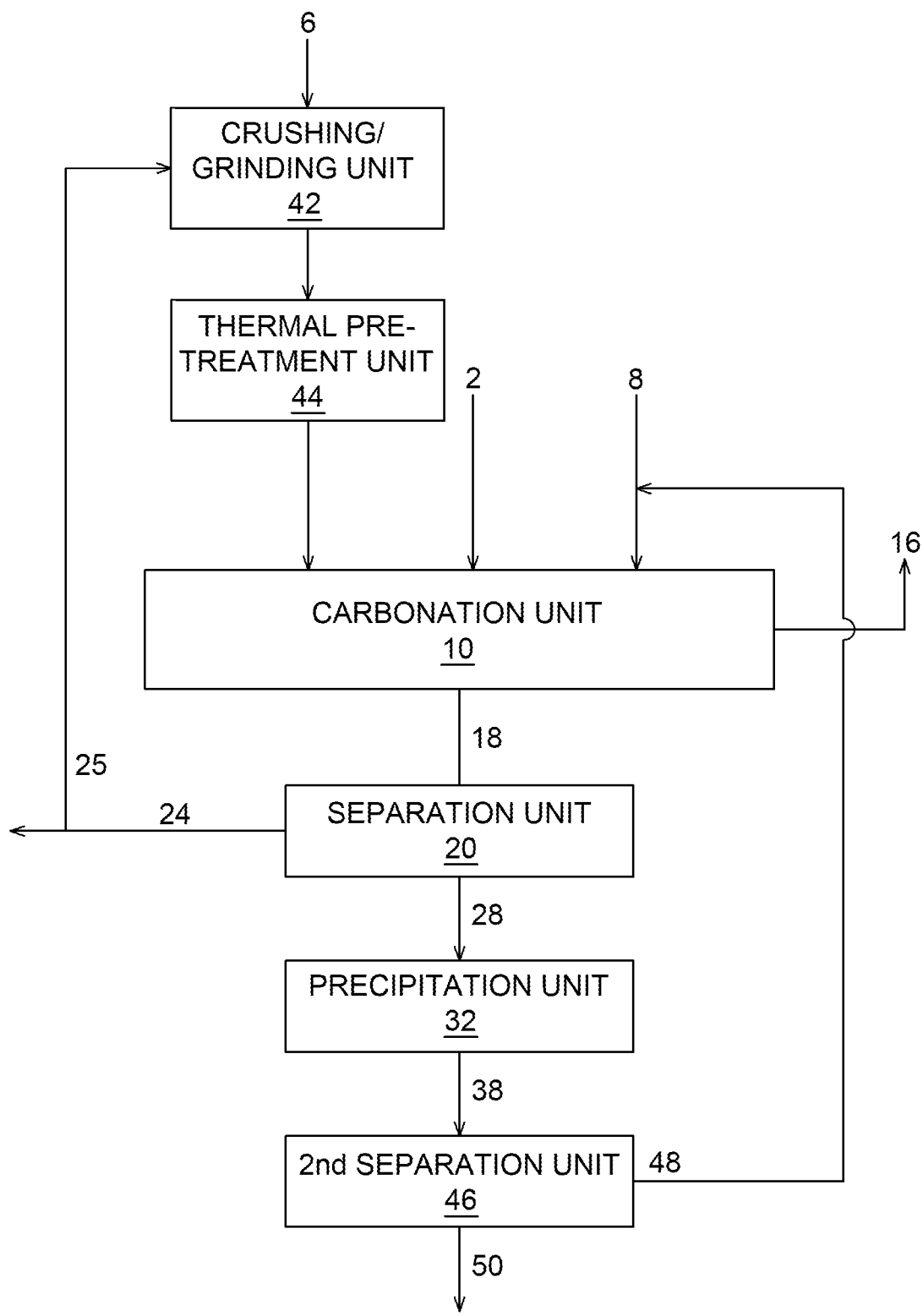
FIG. 3 is a process flow diagram of wet carbonation.

Referring to FIG. 3, the method may include crushing and/or grinding the alkaline earth metal containing material 6 in a crushing/grinding unit 42 so as to reduce the size of the alkaline earth metal containing material particles. The crushed and/or grinded material 6 is then supplied to a thermal pre-treatment unit 44 for dehydroxylation thereof as mentioned above. The water 8 and the pre-treated material 6 may be supplied to the carbonation unit 10 separately so as to form the aqueous slurry within the carbonation unit 10 for contact with the supplied carbon dioxide containing gas 2 to produce the aqueous slurry 18 including precipitable carbonates and the carbon dioxide depleted gas 16. The aqueous slurry 18 is supplied to the separation unit 20 for separation thereof into the aqueous phase 28 including precipitable carbonates and the solid phase 24. At least a portion 25 of the solid phase 24 may be recycled as at least a part of the alkaline earth metal material 6 to the crushing/grinding unit 42. At least part of the aqueous phase 28 including the precipitable carbonates is supplied to the precipitation unit 32 for precipitation of the alkaline earth metal carbonates and production of the precipitation slurry 38. The precipitation slurry 38 may be supplied to a second separation unit 46 for separation into the alkaline earth metal carbonates stream 50 and a liquid stream 48. At least a portion of the liquid stream 48 may be recycled as at least a portion of the water 8 to the carbonation unit 10.

In some optional aspects, the step of precipitating the alkaline earth metal carbonates may be performed at a precipitation temperature between about 20° C. and about 80° C., and a precipitation time between about 0.5 hours and about 12 hours with or without agitation.

In some optional aspects, the precipitates of alkaline earth metal carbonates produced according to the present method have a purity between 90 and 99.9%.

In some optional aspects, the carbon dioxide containing gas may be supplied continuously to the carbonation unit while keeping a certain or desired carbon dioxide removal efficiency (see Example 5). Optionally, the method may be operated according to a series of batch operations including recycling streams so as to increase the solid material carbonation rate (see Example 6). For example, a recirculation method scenario may be performed such that a same portion of alkaline earth material would contact several portions of carbon dioxide containing gas before precipitation into alkaline earth metal carbonates.

In some optional aspects, the method may include recycling the solid phase separated from the carbonate loaded slurry to produce a new portion of aqueous slurry for contacting with the carbon dioxide containing gas in the carbonation unit. It should be noted that recycling may also be referred to herein as recirculating.

Figure 4:
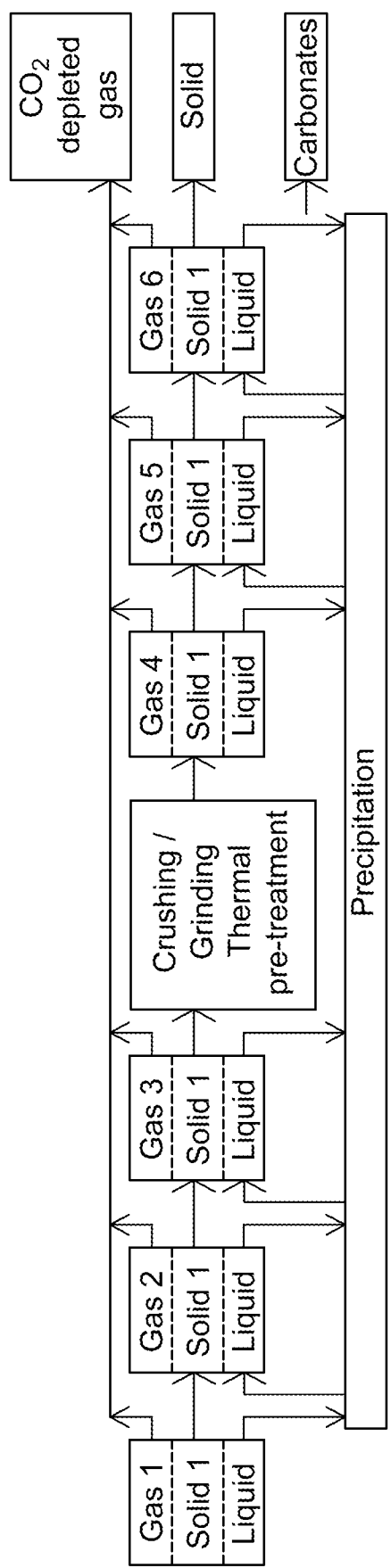
FIG. 4 is a schematic of process steps for wet carbonation with a recirculation scenario.

FIG. 4 shows a method diagram schematic of the various steps associated with recirculation of various liquid and solid streams according to optional embodiments of the present invention. A plurality of streams may indeed be recycled to the carbonation unit while the carbon dioxide containing gas is supplied continuously or in batch mode to the carbonation unit.

Batch Mode Gas Supply

In some optional aspects, the carbon dioxide containing gas may be supplied to the carbonation unit via carbon dioxide containing gas portions.

Step 1:

A first portion of carbon dioxide containing gas, referred to as "Gas 1", is contacted in the carbonation unit during a specific time by an aqueous slurry, resulting from the combination of "Solid 1" and "Liquid". For example, the aqueous slurry may have a mass concentration in alkaline earth metal containing material of 150 g/L, and the aqueous slurry may be contacting each carbon dioxide containing gas portion during 30 minutes.

After each contacting step of 30 minutes, the produced carbonate loaded slurry is separated into a solid phase and an aqueous phase. It should be noted that the first portion of gas "Gas 1" may be provided as two sub-portions for example so as to comply with pressure limits. Two sub-portions of gas, each contacting the solid for 15 minutes, may therefore be provided successively in the carbonation unit.

A mass balance between the carbon dioxide containing gas and the carbon dioxide depleted gas showed that a maximum of 5.91 g $CO_2$/L of gas (1.64 g C/L of gas) was treated after each contact step of 30 minutes.

Step 2:

The aqueous phase is then supplied to the precipitation unit and once the alkaline earth metal carbonates have sufficiently precipitated, the precipitation slurry is separated into a solid stream and an aqueous stream.

Step 3:

The aqueous stream is then recycled as "Liquid" into the carbonation unit.

The three above mentioned steps 1 to 3 are repeated two more times for contacting second and third portions of carbon dioxide containing gas, referred to as "Gas 2" and "Gas 3".

After contacting with "Gas 2" and "Gas 3", the solid phase "Solid 1" is dried, grinded and heated in the pretreatment unit as previously described.

Steps 1 to 3 are performed three more times with the grinded and heated solid phase "Solid 1" to contact successively "Gas 4", "Gas 5" and "Gas 6". After having contacted six carbon dioxide containing gas portions ("Gas 1" to "Gas 6"), the solid phase reaches its reactivity limits.

All the method steps described above may then be repeated with a new portion of alkaline earth metal containing material.

Continuous Mode Gas Supply

In some other optional aspects, the carbon dioxide containing gas flow may be supplied continuously to the carbonation unit. In batch mode, the key parameter to be controlled was the contact time of a portion of carbon dioxide containing gas. Alternatively, in continuous mode, the key parameter to be controlled is the quantity of dissolved carbon dioxide in the aqueous slurry.

According to the above example of batch mode operation, a maximum of 5.91 g $CO_2$/L of gas (1.64 g C/L of gas) was treated after each contact step of 30 minutes. Considering that all of the treated carbon dioxide is dissolved into the aqueous slurry, the maximum concentration of dissolved carbon dioxide should not exceed about 5.0 g C/L. Above this value, precipitation within the reactor may occur.

Therefore, in continuous mode, once a concentration of dissolved carbon dioxide of 5.0 g C/L is measured in the aqueous slurry, the aqueous slurry is removed from the carbonation unit and separated into the solid phase and the aqueous phase. The aqueous phase is then supplied to the precipitation unit.

Optionally, depending on the precipitation rate of the alkaline earth metal carbonates in the precipitation unit, a certain volume of water could be supplied to the aqueous phase in order to maintain a low dissolved carbon dioxide concentration in the recirculated aqueous phase along the steps.

For example, once the cumulative quantity of treated carbon dioxide has reached 16.04 g $CO_2$/L of gas (4.4 g C/L of gas), the separated solid phase may be dried, grinded and heated before further recycling.

Steps 1 to 3 may therefore be performed again successively following the same scenario as described above, in order to reach a cumulative amount of treated carbon dioxide of about 27.28 g $CO_2$/L of gas (7.47 g C/L of gas) for the overall series of three steps 1 to 3. Then, a new portion of alkaline earth metal containing solid may be used.

It should be understood that any one of the above mentioned aspects of each method, method, system, use and material may be combined with any other of the aspects thereof, unless two aspects clearly cannot be combined due to their mutually exclusivity. For example, the various operational steps of the methods described herein-above, herein-below and/or in the appended figures, may be combined with any of the method, system or use descriptions appearing herein and/or in accordance with the appended claims.

It should also be understood that various parameter values obtained and/or described in any of the examples, tables and description herein may be considered as maximal, minimal or intermediate values, and that various ranges may be derived from these maximal, minimal or intermediate values as described herein or in the appended figures and claims.

In some implementations, the MgO production process includes a preceding method for producing magnesium carbonate and sequestering carbon dioxide from a carbon dioxide containing gas. The method can include: contacting the carbon dioxide containing gas with an aqueous slurry including an alkaline earth metal containing material in a carbonation unit for carbonation of at least a portion of an alkaline earth metal to produce a carbon dioxide depleted gas and a carbonate loaded slurry including precipitable carbonates and substantially free of precipitated alkaline earth metal carbonates; removing the carbonate loaded slurry from the carbonation unit and separating the carbonate loaded slurry into an aqueous phase including the precipitable carbonates and a solid phase; and supplying the aqueous phase to a precipitation unit and precipitating alkaline earth metal carbonates in the precipitation unit to produce a precipitation slurry.

In some implementations, the aqueous phase may include the precipitable carbonates and may be substantially free of precipitated alkaline earth metal carbonates.

In some implementations, the method may further include the step of agitating the aqueous slurry including an alkaline earth metal containing material during the step of contacting in the carbonation unit. Optionally, the method may also include the step of agitating the aqueous phase during the step of precipitating the alkaline earth metal carbonates in the precipitation unit.

In some implementations, the method may further include the step of mixing the alkaline earth metal containing material with water, prior to the step of contacting, to dissolve alkaline earth metal ions in aqueous phase and form the aqueous slurry.

In some implementations, the method may further include the step of mixing the alkaline earth metal containing material with water, simultaneously to the step of contacting, to dissolve alkaline earth metal ions in aqueous phase and form the aqueous slurry within the carbonation unit.

Optionally, the step of mixing may be performed so as to form the aqueous slurry having a mass concentration between 25 g/L and 300 g/L in grams of total solids per liter of aqueous slurry.

In some implementations, the method may further include separating the precipitation slurry into a solid stream including the alkaline earth metal carbonates and an aqueous stream.

In some implementations, the method may further include drying the solid stream including the alkaline earth metal carbonates.

In some implementations, the method may further include recycling at least a portion of the aqueous stream into the carbonation unit.

In some implementations, the method may further include recycling at least a portion of the solid phase into the carbonation unit as at least part of the alkaline earth metal containing material for contacting with the carbon dioxide containing gas.

In some implementations, the method may further include thermally pre-treating the alkaline earth metal containing material for dehydroxylation thereof, to produce a pre-treated alkaline metal earth containing material for contacting with the carbon dioxide containing gas. Optionally, the step of thermally pre-treating the alkaline earth metal containing material may include heating the alkaline metal earth containing material at a temperature between about 500° C. and about 800° C. during a pre-treating time of about 10 minutes to about 60 minutes. Optionally, the temperature may be between about 600° C. and about 700° C. and the pre-treating time may be between about 15 minutes and about 40 minutes.

In some implementations, the method may further include crushing and/or grinding the alkaline metal earth containing material prior to the step of contacting with the carbon dioxide containing gas. Optionally, the step of crushing and/or grinding may be performed prior to the step of thermally pre-treating the alkaline earth metal containing material. Further optionally, the step of crushing and/or grinding may be performed to obtain solid particles having a median particle size between about 10 µm and about 45 µm and so as to obtain 90% of the solid particles having a particle size between about 0 µm and about 75 µm.

In some implementations, the carbon dioxide containing gas may be derived from industrial emissions and may have a carbon dioxide concentration between 1% and 30%.

In some implementations, the method may further include controlling at least one of a carbonation temperature, an agitation speed and a carbonation pressure in the carbonation unit.

Optionally, the step of contacting in the carbonation unit may be performed at the carbonation temperature between about 10° C. and about 40° C. Optionally, the carbonation temperature may be between about 20° C. and about 30° C.

Optionally, the step of contacting in the carbonation unit may be performed at the carbonation pressure between about 1 bar and about 20 bars. Optionally, the carbonation pressure may be between about 2 bars and about 12 bars.

Optionally, the agitation speed in the carbonation unit may be between about 400 rpm and about 800 rpm, and further optionally between about 500 rpm and about 650 rpm.

In some implementations, the step of precipitating may be performed at a precipitation temperature between about 20° C. and about 80° C. for a precipitation time between about 0.5 hours and about 12 hours. Optionally, the step of precipitating may include agitating the aqueous phase.

In some implementations, the alkaline earth metal containing material may include at least one of sandstone, granite, anorthosite, basalt, serpentinite, peridotite, serpentinized peridotite, ophiolitic rocks, mafic and ultramafic rocks, rocks containing more than 10% of pyroxene and peridot, calcium silicate, magnesium silicate, feldspar, plagioclase feldspar, peridot, pyroxene, olivine, serpentine, wollastonite, calcium oxide, magnesium oxide, brucite, mafic and ultramafic minerals, steelmaking slag, steelmaking worn MgO brick, rotary kiln dust (CKD, LKD), waste cement, waste concrete, construction and demolition waste, concrete with aggregates, concrete brick, concrete, red brick, phyllosilicate mining residue and chrysotile mining residue.

In some implementations, the alkaline earth metal may include calcium or magnesium.

In some implementations, the method may further include supplying continuously the carbon dioxide containing gas to the carbonation unit. Optionally, the method may include controlling or managing a maximal quantity of dissolved carbon dioxide in the carbonate loaded slurry produced in the carbonation unit, the maximal quantity of dissolved carbon dioxide being chosen to reduce or avoid precipitation of the alkaline earth metal carbonates in the carbonation unit. Optionally, the maximal quantity of dissolved carbon dioxide may be at most 5 g/L.

In some implementations, the carbon dioxide containing gas may include a plurality of carbon dioxide containing gas portions, the method including: supplying at least one carbon dioxide containing gas portion to the carbonation unit; contacting the aqueous slurry with the at least one carbon dioxide containing gas portion in the carbonation unit for production of the carbonate loaded slurry; removing the carbonate loaded slurry from the carbonation unit and separating the carbonate loaded slurry into the aqueous phase including the precipitable carbonates and the solid phase; and recycling the solid phase to the carbonation unit and supplying water to the carbonation unit to form a new portion of aqueous slurry; contacting the new portion of aqueous slurry with another carbon dioxide containing gas portion for production of the carbonate loaded slurry.

In some implementations, the carbon dioxide containing gas may be supplied to the carbonation unit as a plurality of carbon dioxide containing gas portions, the method including: contacting the aqueous slurry with at least one carbon dioxide containing gas portion in the carbonation unit for production of the carbonate loaded slurry; removing the carbonate loaded slurry from the carbonation unit and separating the carbonate loaded slurry into the aqueous phase including the precipitable carbonates and the solid phase; and supplying the aqueous phase including the precipitable carbonates to the precipitation unit, precipitating the alkaline earth metal carbonates in the precipitation unit to produce the precipitation slurry and separating the precipitation slurry into a solid stream including the alkaline earth metal carbonates and an aqueous stream; recycling the solid phase and the aqueous stream to the carbonation unit to produce a new portion of aqueous slurry and contacting the new portion of aqueous slurry with another carbon dioxide containing gas portion for production of the carbonate loaded slurry.

Optionally, the method may include supplying water to the carbonation unit as a make up stream of the new portion of aqueous slurry.

In some implementations, the step of contacting in the carbonation unit may be performed for a maximal gas contact time, the maximal gas contact time being controlled or managed to reduce or avoid precipitation of the alkaline earth metal carbonates in the carbonation unit. Optionally, the maximal gas contact time may be between about 1 minute and about 60 minutes.

In some implementations, the method may also include crushing and/or grinding the solid phase prior to the step of recycling to the carbonation unit to produce the new portion of aqueous slurry.

In some implementations, there is provided a method for sequestering carbon dioxide from a carbon dioxide containing gas. The method includes: contacting the carbon dioxide containing gas with an aqueous slurry including a magnesium containing material in a carbonation unit at a carbonation temperature between about 10° C. and about 40° C. and a carbonation pressure between about 1 bar and about 20 bars, for carbonation of at least a portion of magnesium to produce a carbon dioxide depleted gas and a carbonate loaded slurry including precipitable carbonates and substantially free of precipitated magnesium carbonates.

In some implementations, the method may include: removing the carbonate loaded slurry from the carbonation unit and separating the carbonate loaded slurry into a solid phase and an aqueous phase including precipitable carbonates and substantially free of precipitated magnesium carbonates; and supplying the aqueous phase to a precipitation unit and precipitating magnesium carbonates in the precipitation unit to produce a precipitation slurry including the precipitated magnesium carbonates.

In some implementations, the method may further include separating the precipitation slurry into a solid stream including the precipitated magnesium carbonates and an aqueous stream.

In some implementations, there is provided a method for sequestering carbon dioxide from a carbon dioxide containing gas, the method including contacting the carbon dioxide containing gas with an alkaline earth metal containing material in a substantially dry form in at least one carbonation unit at a carbonation temperature between about 200° C. and about 500° C. and a carbonation pressure between about 1 bar and about 20 bars, for carbonation thereof to produce carbonates and a carbon dioxide depleted gas.

In some implementations, there is provided a method for sequestering carbon dioxide from industrial emissions by contacting the industrial emissions with magnesium silicate material, in wet or dry form, to produce a carbon dioxide depleted gas and a carbonated magnesium silicate material.

In some implementations, there is provided a method for manufacturing alkaline earth metal carbonates, the method including: a contacting stage wherein industrial emissions including carbon dioxide are contacted with an aqueous slurry including an alkaline earth metal containing material, to produce a carbon dioxide depleted gas and an alkaline earth metal carbonate stream substantially free of precipitated alkaline earth metal carbonates; a precipitation stage wherein alkaline earth metal carbonates are precipitated from the alkaline earth metal carbonate stream, thereby producing a precipitation slurry; and a separation stage wherein the precipitation slurry is separated into the precipitated alkaline earth metal carbonates and an aqueous phase.

In some implementations, there is provided a method for manufacturing alkaline earth metal carbonates, the method including: a contacting stage wherein industrial emissions including carbon dioxide are contacted with an aqueous slurry including an alkaline earth metal containing material, to produce a carbon dioxide depleted gas and an alkaline earth metal carbonate stream including precipitable carbonates and substantially free of precipitated alkaline earth metal carbonates; a first separation stage wherein the alkaline earth metal carbonate stream is separated into a solid phase and an aqueous phase including the precipitable carbonates and substantially free of precipitated alkaline earth metal carbonates; a recycling stage wherein the solid phase is recycled to the carbonation stage as at least a portion of the alkaline earth metal containing material; a precipitation stage wherein alkaline earth metal carbonates are precipitated from the aqueous phase, thereby producing a precipitation slurry including the precipitated alkaline earth metal carbonates; and a separation stage wherein the precipitation slurry is separated into the precipitated alkaline earth metal carbonates and an aqueous phase.

In some implementations, there is provided a carbon dioxide sequestration system for sequestering carbon dioxide from a carbon dioxide containing gas. The system includes: at least one carbonation unit having: a gas inlet for receiving the carbon dioxide containing gas, a slurry inlet for receiving an aqueous slurry including an alkaline earth metal containing material, a carbonation vessel for the carbonation of at least a portion of an alkaline earth metal of the aqueous slurry with carbon dioxide to produce a carbon dioxide depleted gas and a carbonate loaded slurry including precipitable carbonates and substantially free of precipitated alkaline earth metal carbonates, a slurry outlet for releasing the carbonate loaded slurry including precipitable carbonates, and a gas outlet for releasing the carbon dioxide depleted gas; a separation unit having: a slurry inlet for receiving the carbonate loaded slurry including precipitable carbonates from the slurry outlet of the at least one carbonation unit, a separation chamber for separation of the carbonate loaded slurry including precipitable carbonates into a solid phase and an aqueous phase including the precipitable carbonates and substantially free of precipitated alkaline earth metal carbonates, a liquid outlet for releasing the aqueous phase, and a solid outlet for releasing the solid phase; and a precipitation unit having: a slurry inlet for receiving the aqueous phase including the precipitable carbonates from the liquid outlet of the separation unit, a precipitation chamber for precipitation of the alkaline earth metal carbonates and formation of a precipitation slurry, and a liquid outlet for releasing the precipitation slurry.

In some implementations, there is provided a use of a magnesium containing material in the form of an aqueous slurry to contact and sequestrate carbon dioxide from a carbon dioxide containing gas at a temperature between about 20° C. and about 30° C. and a pressure between about 2 bars and about 12 bars to form magnesium carbonates.

In some implementations, there is provided a use of a phyllosilicate mining residue to sequestrate carbon dioxide from industrial emissions and produce magnesium carbonates. Optionally, the phyllosilicate mining residue includes at least one of lizardite, antigorite, brucite, iron oxide, chromium oxide and chrysotile.

In some implementations, there is provided a precipitated calcium or magnesium carbonate (PCC or PMC) produced by contacting a calcium or magnesium containing material in wet form with carbon dioxide from industrial emissions in a carbonation unit to form a carbonate loaded slurry, and precipitating the calcium or magnesium carbonate from the carbonate loaded slurry in a precipitation unit.

In some implementations, there is provided a precipitated calcium or magnesium carbonate (PCC or PMC) including at least 95 wt % of calcium or magnesium carbonate in dry form or hydrated form.

It is also noted that a higher $CO_2$ content in the calcination exhaust gas is preferable for the carbonation reaction and will enhance the overall process efficiency. Calcination can be operated to obtain a higher $CO_2$ content, in some cases, for example by operation of the calcination unit at certain operating conditions and using certain reactants. For instance, in some implementations, the calcination unit can be operated to increase CO2 concentration in the emissions by ensuring complete combustion of the natural gas or other combustible that is used, which can include providing excess pre-heated air to promote complete combustion and reduce consumption of the combustible. The feed rate of the air can be controlled accordingly, and calcination unit can be sealed appropriately to minimize introduction of other gases that could dilute the system. In addition, the calcination unit can be operated by increasing the oxygen content in the gas feed, thereby reducing the concentration of other gas components that would be present in air. The oxygen level can be provided and/or the calcination unit can be otherwise operated such that the resulting emissions has a $CO_2$ content that is higher than the $CO_2$ content of the flue gas fed to the carbonation unit. In this manner, the recycling of $CO_2$ from calcination back into the carbonation step can increase the $CO_2$ concentration and thereby enhance the overall performance. In some examples, the $CO_2$ concentration of the recycled emissions can be at least 1%, 2%, 5%, 10%, 15%, 20%, 25%, 30%, 40% or 50% greater than the concentration of $CO_2$ in the flue gas.

In some implementations, the process includes contacting a $CO_2$-containing stream with a magnesium-containing material to produce magnesium carbonate; subjecting the magnesium carbonate to calcination to produce a $CO_2$-containing gas by-product and magnesia, the $CO_2$-containing gas by-product having a higher $CO_2$ concentration than the $CO_2$-containing stream; and recycling at least a portion of the $CO_2$-containing gas by-product for contacting the magnesium-containing material to produce the magnesium carbonate. The $CO_2$-containing stream can be from a first emissions source, and can be a flue gas (e.g., from a power plant or another emitter). The $CO_2$-containing stream can have a $CO_2$ content of 10 wt % to 20 wt %, for example. The $CO_2$-containing gas by-product can have a higher $CO_2$ content, which could be a few percentage points higher (e.g., 12 wt % to 22 wt % $CO_2$) or could be substantially higher (e.g., 30 wt %, 40 wt %, 50 wt % or even close to 100 wt % $CO_2$).

It is noted that a preferred operation is to provide a $CO_2$-containing gas by-product with a $CO_2$ content that is a certain proportion (e.g., from 10% to 50%) greater than the $CO_2$ content of the $CO_2$-containing stream. For example, the $CO_2$-containing stream could have a $CO_2$ content of about 15 wt % while the $CO_2$-containing gas by-product could have a $CO_2$ content of about 18 wt % (which is 20% higher). This can be achieved without the added expense of operating the calcination unit with pure oxygen, but rather using control of operating parameters of the calcination unit.

Nevertheless, it should be noted that in alternative embodiments the process can be operated such that the recycled $CO_2$-containing gas by-product has a lower $CO_2$ concentration compared to the initial $CO_2$-containing flue gas fed into the carbonation step, or a generally similar $CO_2$ content. When relatively variable $CO_2$ contents are seen in the two gas streams, the relative proportions can be modified to obtain a constant $CO_2$ content fed to the carbonation unit, or the two streams can be supplied to carbonation without concentration control, resulting in a variable $CO_2$ content in the reactant gas. It is also noted that the two $CO_2$-containing streams can be fed to the same carbonation vessel, via different feed inlets or the same feed inlet, or they can be fed to distinct carbonation vessels, or a combination thereof.

EXAMPLES & EXPERIMENTS

Experimentation 1: Wet Carbonation of Chrysotile Mining Residues

A first series of experiments were carried out, using chrysotile mining residues composed of lizardite, antigorite, brucite, iron oxides, chromium oxides and a low content of chrysotile, to optimize conditions for the wet carbonation on sample size of around 7 g with grain size inferior to 75 μm and a pulp density of 15% (a mass of 150 g of solid per liter of liquid). The temperature and reaction duration were kept stable at 25° C. and 6 h respectively. The variable parameters are pressure, NaCl and $NaHCO_3$ content and heat treated sample or not. They were optimized on the basis of percentage of $CO_2$ removal and the percentage of solid carbonate formed (dependent variables). The various conditions and results obtained are given in Table 1.

From this table, it appears that a removal of $CO_2$ up to 87% can be achieved for a pressure of 10.2 atm and heat treated sample. $CO_2$ removal seems independent from NaCl content and slightly dependent to $NaHCO_3$ content in the solution, while thermal pre-treatment is necessary. On a run of 6 h, in these conditions, 24% of the sample had been carbonated.

TABLE 1

Box-Benkhen matrix for the first set of assays and results (T = 25° C., t = 6 h)

| Run | Pressure (atm) | NaCl (M) | $NaHCO_3$ (M) | Thermal Pre-treatment | $CO_2$ removal (%) | Carbonate solid formation (%) |
|---|---|---|---|---|---|---|
| 1 | 45.9 | 0.5 | 0.32 | Yes | 30 | 0 |
| 2 | 10.2 | 0.5 | 0.64 | Yes | 78 | 5.43 |
| 3 | 10.2 | 1 | 0.32 | No | 49 | 2.24 |
| 4 | 10.2 | 0.5 | 0 | Yes | 79 | 19.13 |
| 5 | 45.9 | 1 | 0 | No | 21 | 0 |
| 6 | 45.9 | 0.5 | 0.32 | No | 27 | 0.4 |
| 7 | 81.7 | 1 | 0.32 | No | 23 | 0.16 |
| 8 | 81.7 | 0.5 | 0.64 | No | 10 | 0.91 |
| 9 | 10.2 | 0 | 0.32 | No | 44 | 0.72 |
| 10 | 45.9 | 0.5 | 0.32 | No | 15 | 0.4 |
| 11 | 81.7 | 1 | 0.32 | Yes | 31 | 0.19 |
| 12 | 45.9 | 0.5 | 0.32 | Yes | 35 | 0.66 |
| 13 | 45.9 | 0 | 0 | Yes | 28 | 0 |
| 14 | 45.9 | 0.5 | 0.32 | No | 15 | 0.68 |
| 15 | 45.9 | 0.5 | 0.32 | No | 13 | 0.33 |
| 16 | 45.9 | 1 | 0.64 | No | 19 | 0.87 |
| 17 | 45.9 | 0.5 | 0.32 | Yes | 45 | 0 |
| 18 | 10.2 | 1 | 0.32 | Yes | 84 | 37.06 |
| 19 | 45.9 | 1 | 0.64 | Yes | 31 | 1.22 |
| 20 | 45.9 | 1 | 0 | Yes | 29 | 0 |
| 21 | 45.9 | 0 | 0.64 | No | 20 | 0.88 |
| 22 | 45.9 | 0.5 | 0.32 | No | 31 | 0.52 |
| 23 | 10.2 | 0.5 | 0 | No | 46 | 0 |
| 24 | 81.7 | 0 | 0.32 | Yes | 32 | 1.21 |
| 25 | 45.9 | 0.5 | 0.32 | Yes | 32 | 0.36 |
| 26 | 10.2 | 0.5 | 0.64 | No | 42 | 2.88 |
| 27 | 45.9 | 0 | 0.64 | Yes | 38 | 0.6 |
| 28 | 81.7 | 0 | 0.32 | No | 13 | 0.57 |
| 29 | 81.7 | 0.5 | 0 | Yes | 32 | 0 |
| 30 | 81.7 | 0.5 | 0.64 | Yes | 37 | 1.25 |
| 31 | 45.9 | 0.5 | 0.32 | Yes | 36 | 0 |
| 32 | 45.9 | 0 | 0 | No | 20 | 0 |
| 33 | 81.7 | 0.5 | 0 | No | 10 | 0 |
| 34 | 10.2 | 0 | 0.32 | Yes | 87 | 40.01 |

The time duration of 6 h for carbonation in optimized conditions was very long, carbonation assays were carried out for shorter reaction time to verify the time dependency of the rate of wet carbonation. The experiments conditions and results are presented in Table 2. Temperature is kept constant at 25° C. and pulp density is kept constant at 15%.

TABLE 2

Experimental conditions and results for wet carbonation of heat treated sample for 30 min duration Input

| | Time (min) | Volume Liq. (mL) | Weight Spl. (g) | Pressure (atm) | $CO_2$ removal (%) | $PCO_2$ (atm) |
|---|---|---|---|---|---|---|
| A | 30 | 50 | 7.02 | 11.2 | 18.2 | 2.03 |
| B | 30 | 50 | 6.90 | 10.3 | 18.2 | 1.87 |
| C | 30 | 50 | 6.87 | 10.8 | 18.2 | 1.96 |

Output

| | $CO_2$ Lost (%) | Vol. Liq. End (mL) | Weight Spl. End (g) | Pressure End (atm) | $CO_2$ removal End (%) | $PCO_2$ (atm) |
|---|---|---|---|---|---|---|
| A | 83 | 45 | 6.81 | 9.05 | 3.9 | 0.35 |
| B | 82 | 45 | 6.84 | 8.64 | 4.0 | 0.35 |
| C | 82 | 43 | 6.80 | 8.57 | 4.1 | 0.35 |

A removal of 82% of $CO_2$ was achieved after a reaction time of 30 min.

Experimentation 2—Wet Carbonation of Serpentinite

This experiment describes the feasibility of the method for the treatment of a batch of gas containing 18.2% of carbon dioxide during 15 minutes. The gas liquid ratio (GLR) was fixed at 300% which represents a volume of carbon dioxide containing gas of 225 mL and a volume of 75 mL of water. The resulting aqueous slurry had a 15 wt % concentration of solid material. Reaction temperature was set at ambient temperature (18-25° C.). A pressure of 10.5 bars was applied which represented an amount of 0.78 g of $CO_2$ at 20° C.

Once the pressure reached, all valves of the reactor were closed and reaction occurred for 15 minutes. The resulting carbon dioxide depleted gas was then sampled through a bag. The carbon dioxide concentration in the carbon dioxide depleted gas was measured by a $CO_2$ analyzer. The resulting aqueous slurry was filtered and samples were taken for analysis.

Reaction under ambient temperature at 10.5 bars during 15 minutes showed an efficiency of 88±1% on the $CO_2$ removal as seen in Table 3.

TABLE 3

Carbon dioxide mass balance for 15 minutes reaction at 10.5 bars (number of assays = 3)

| | Entry | Exit | $CO_2$ treated | Efficiency |
|---|---|---|---|---|
| $CO_2$ (g$CO_2$) | 0.80 ± 0.02 | 0.09 ± 0.01 | 0.71 ± 0.02 | 88 ± 1% |

Experimentation 3—Optimisation of Thermal Pre-Treatment of Serpentinite Before Wet Carbonation Another series of experiments was performed to show that the thermal pre-treatment of the alkaline earth metal containing material favors a good removal of carbon dioxide from the carbon dioxide containing gas.

A serpentinite based mining residue was used as alkaline earth metal containing material. Firstly, depending on the grain size, the residue was crushed, and then grinded. The best results were obtained with samples with a particle size lower than 45 μm (median size 10 μm). In order to obtain a chemically reactive material, the serpentinite based mining residue has to be further pre-treated to allow dehydroxylation of the serpentinite. By removing water from the various crystalline structures of the minerals, the chemical structure of the sample is altered and thus lowers the bound energies. The heat activation of hydrated silicates is well known to favour chemical activation prior to lixiviation [Nagamori et al. (1980) *Activation of magnesia in serpentine by calcination and the chemical utilization of asbestos tailings*—A review. CIM Bulletin 73, pp. 144-156].

Figure 5:
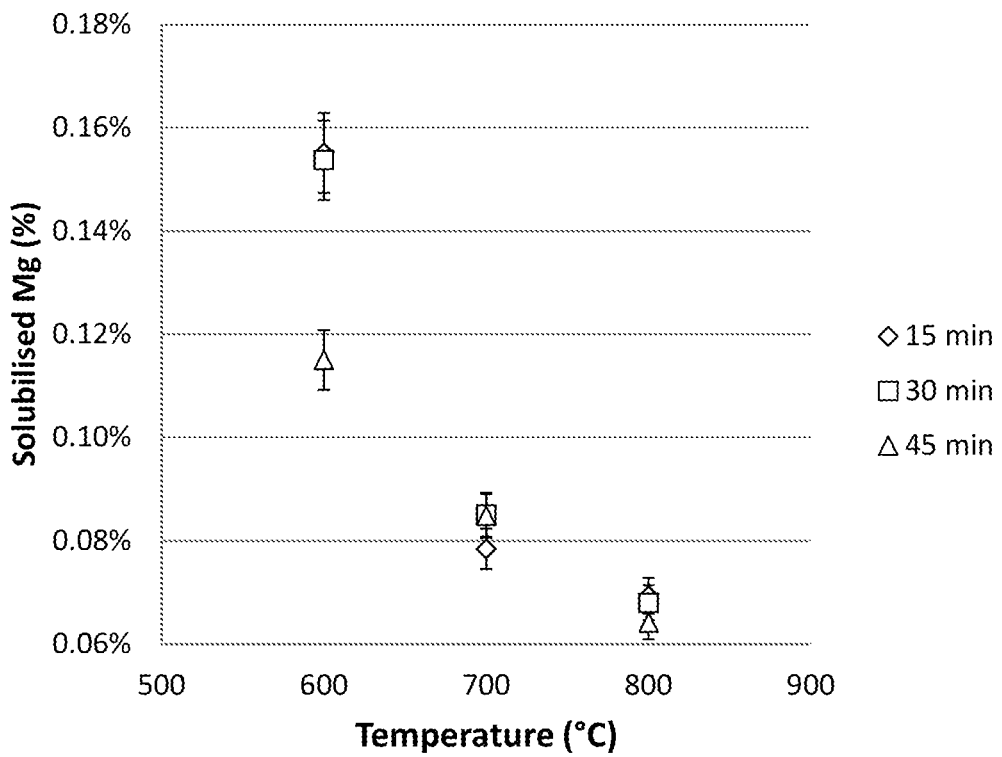
FIG. 5 is a solubilised magnesium quantity vs temperature graph for wet carbonation with three different reaction times.
Figure 6:
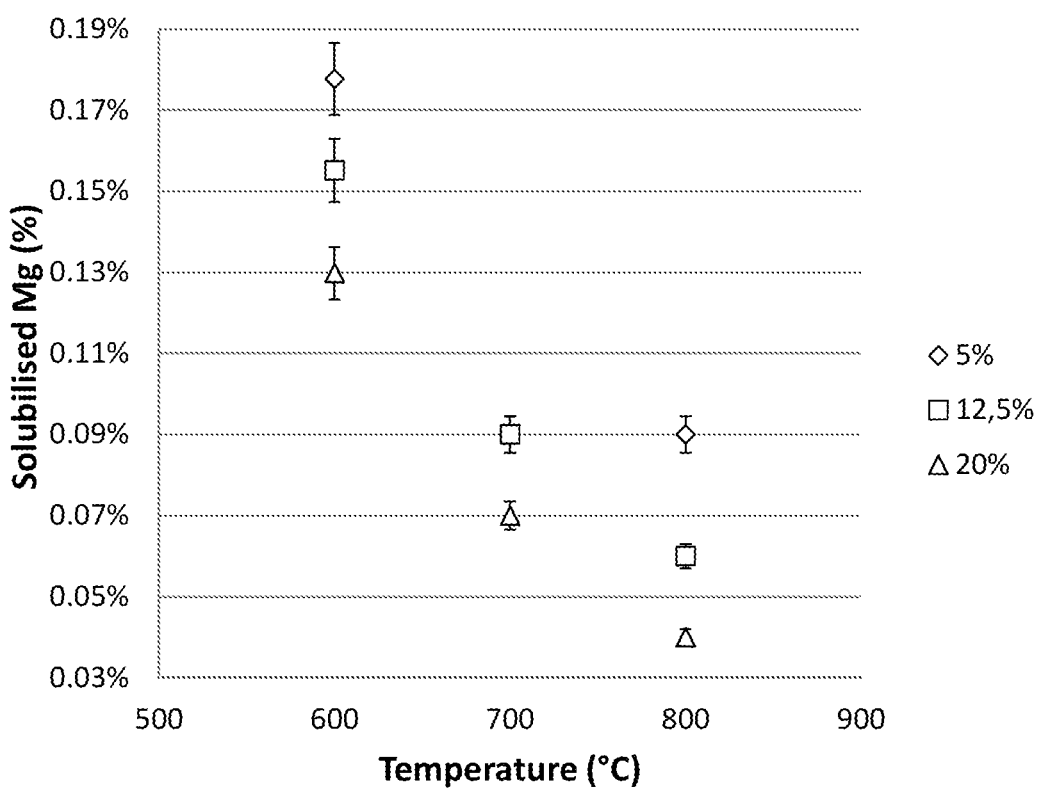
FIG. 6 is a solubilised magnesium quantity vs temperature graph for wet carbonation of an aqueous slurry with three different pulp densities.

The optimization of thermal pre-treatment was carried out following the magnesium concentration after leaching dissolved in water (beaker). Referring to FIGS. 5 and 6, influence of temperature and pre-treatment time, and the pulp density during the extraction for 30 minutes in water with stirring at 600 rpm have been studied. According to a thermogravimetric analysis, the major weight loss of the sample studied is observed at 650° C. Essays on heat activation showed that best results were obtained after a 30 minutes treatment at 650° C. with a mass loss around 10%.

Experimentation 4—Optimisation of Reaction Parameters for Wet Carbonation

Another series of experiments has been performed to optimize reaction parameters including carbonation pressure, reaction time, gas/liquid ratio (GLR) and pulp density of the aqueous slurry. To enhance gaseous carbon dioxide solubility in water, the reaction temperature was set at room temperature (18-25° C.) as solubility is increased at lower temperatures. Pressure is a key process parameter as it influences the quantity of carbon dioxide introduced in the reactor.

The experiments were conducted with a carbon dioxide containing gas whose characteristics are comparable to a cement plant flue gas. The composition is respectively 18.2% $CO_2$, 4.11% $O_2$, and 77.69% $N_2$. Reactions were realized in a 300 mL stirred reactor from Parr Instrument Company, Moline IL USA.

Pressure

Tests on pressure effect showed that working at low pressure was not affecting the reaction efficiency. Indeed, lowering pressure results in introducing a small quantity of carbon dioxide in the reactor. For batch wise experiments, in order to maintain a certain quantity of carbon dioxide introduced in the reactor, pressure was set to 10.5 bars.

GLR and Pulp Density

Parameters such as the gas/liquid ratio (GLR) and the pulp density had been determined by a set of experiments with a reaction time of 30 minutes. Decreasing the GLR did not impact the carbon dioxide removal from the flue gas but decreased the quantity of carbon dioxide introduced in the reactor. On the other hand, the quantity of flue gas treated was lower when pulp density was set at 5%. In order to increase the quantity of gas treated, experiments on GLR and pulp density were realized with successive batch of gas.

Figure 7:
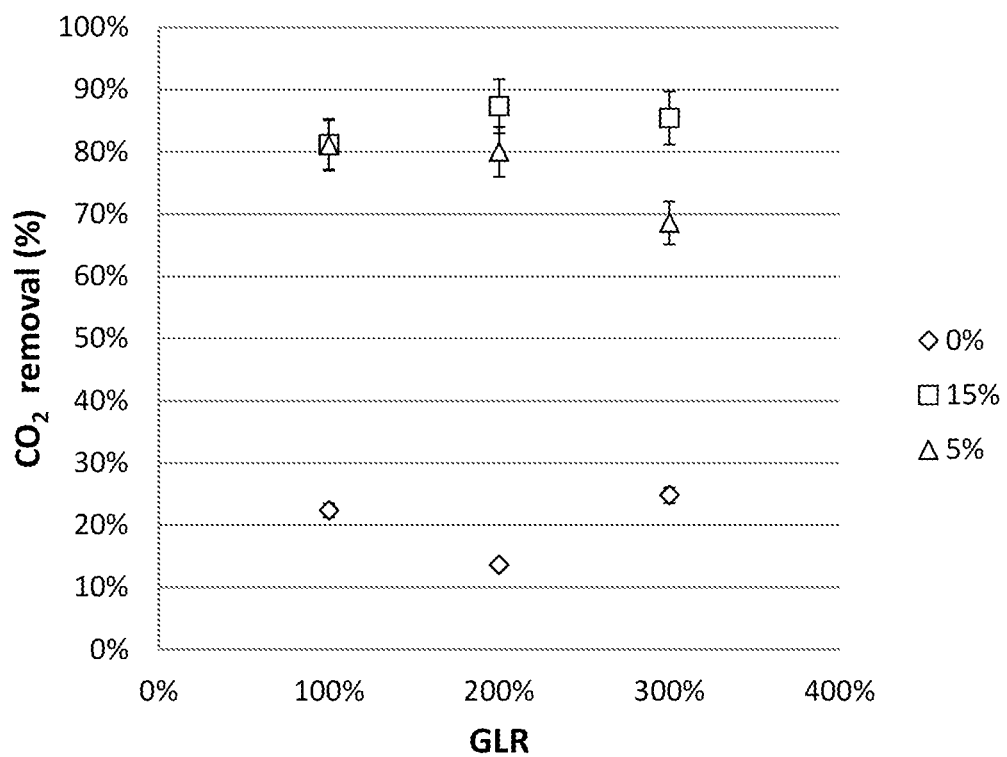
FIG. 7 is a $CO_2$ removal vs gas/liquid ratio (GLR) graph for wet carbonation of an aqueous slurry of various pulp densities.

As the objective is to form alkaline earth metal carbonates with a resale potential, it is important to have the purest final product possible. Experiments with a GLR of 100% and a pulp density of 15% showed that a significant amount of carbonates was precipitated within the reactor. However, it may be desired to precipitate carbonates outside of the reactor so as to easily separate precipitable carbonates and obtain thereafter carbonates with high purity of about 95%. FIG. 7 shows that good yields of $CO_2$ removal and a high concentration of magnesium in solution are encountered with an aqueous slurry of 15% pulp density and a GLR of 300%.

Once the principal parameters of the reaction were settled, the reaction time was reduced.

Reaction Time

Figure 8:
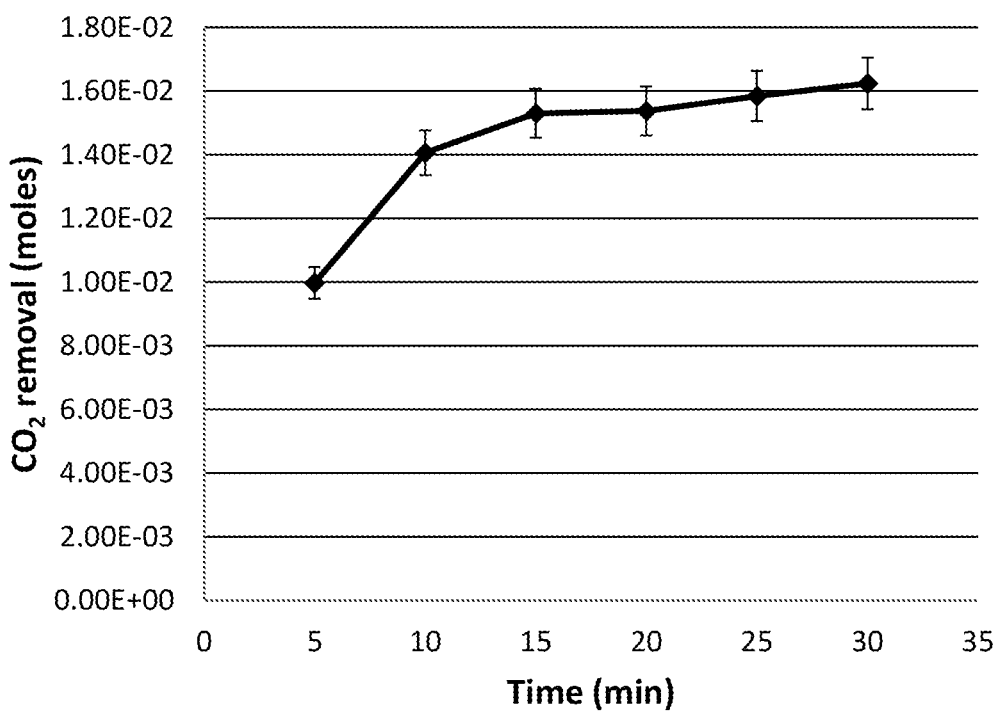
FIG. 8 is a $CO_2$ removal vs time graph for wet carbonation.

A series of experiments was carried out to reduce the reaction time. FIG. 8 shows the carbon dioxide removal results. The removal was 56% for a reaction time of 5 min, and 83% for a reaction time of 10 min. Same efficiencies as observed for 30 minutes were achieved in 15 minutes. However, the amount of magnesium present in solution is multiplied by 1.45, respectively 341 mg/L for 30 minutes against 495 mg/L for 15 minutes. A residence time of 15 min is reasonable for an industrial application and provides better efficiency on the solubilisation of magnesium.

Figure 9:
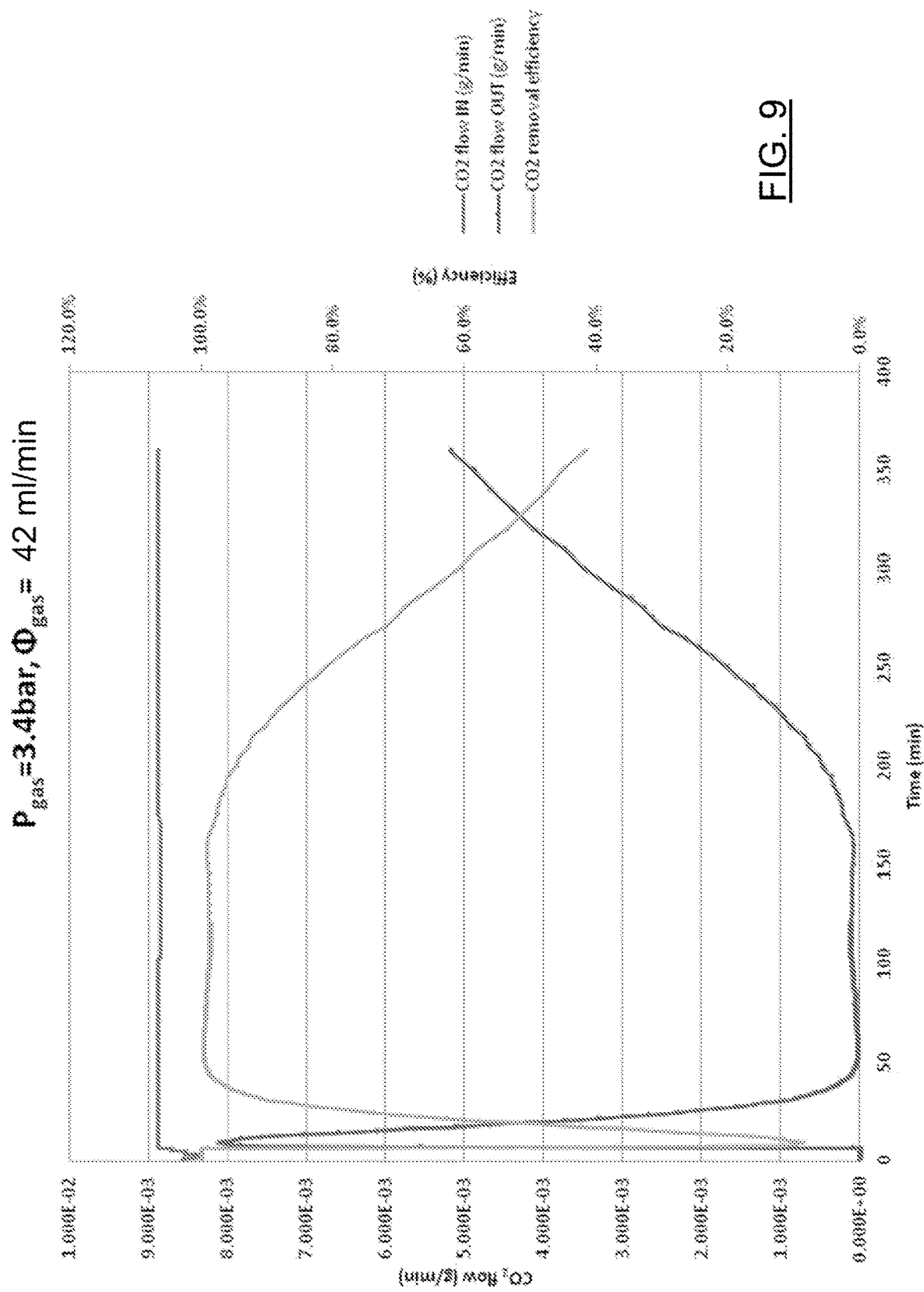
FIG. 9 is a $CO_2$ flow vs time graph for wet carbonation in continuous mode showing $CO_2$ removal efficiency at 3.4 bars and 42 mL/min.

Experimentation 5—Wet Carbonation of Serpentinite Under Continuous Operation An experiment has been realized under continuous conditions. The aim was to confirm feasibility of the reaction under gentle conditions of pressure and temperature. Carbon dioxide containing gas flow was regulated by a mass flow controller. Pressure in the reactor was controlled by a pressure gauge valve set at the desired pressure. The experiment was conducted at 3.4 bars with a carbon dioxide containing gas flow of 42 mL/min (7.64 mL $CO_2$/min). Referring to FIG. 9, after an equilibrium phase of around 50 min, it was observed that the efficiency of the carbon dioxide removal stayed constant at more than 98% during 130 minutes. Then, the efficiency decreased following a linear trend. In the end, the overall quantity of carbon dioxide that reacted was 2.61 g $CO_2$ out of the 3.19 g $CO_2$ that were introduced. Compared to the initial magnesium content of the material introduced into the reactor, the overall leaching of the magnesium was 50.8%.

Experimentation 6—Recirculation Scenario

A recirculation scenario is based on treating a plurality of "batches" of carbon dioxide containing gas with recirculated solid streams and liquid streams. Experiments have been performed for series of 6 batches of gas under the same conditions as defined in Example 2. The term "batch" is herein defined by 225 ml of gas (0.78 g $CO_2$) at 10.5 bars reacting for 15 min under an agitation of 600 rpm.

The aqueous slurry was composed of 15% of solid in 75 ml of water and was contacted with two batches of carbon dioxide containing gas before filtration into a solid phase and an aqueous phase. The same filtered solid phase was again mixed in 75 ml of "new" water (or recirculated water) for contacting two more batches of carbon dioxide containing gas. The operation was repeated for a total of 6 batches of carbon dioxide containing gas. After each filtration, the filtered aqueous stream which is rich in dissolved magnesium and carbon dioxide was supplied to a precipitator for precipitation of magnesium carbonates.

Precipitation conditions have been set at 40° C. under 300 rpm agitation. The filtered solid phase, after contacting 6 batches of carbon dioxide containing gas, is grinded and heated in order to improve further magnesium lixiviation. Then, the treated solid phase is recirculated in the reactor for contacting 6 more batches of carbon dioxide containing gas.

A total of 12 batches of carbon dioxide containing gas was therefore treated by the same solid phase. The aqueous phase was filtered after contacting two batches of carbon dioxide containing gas and fresh water was used after contacting two batches of carbon dioxide containing gas.

Results are summarized in Table 4. Carbonation of the solid material is 64% after contact with 12 batches assuming that all the magnesium contained in the aqueous phase precipitated.

Experimentation 7—Dry Gas-Solid Carbonation

Example 7 describes dry gas-solid carbonation experiments according to optional embodiments of the present invention.

In this series of experiments, the alkaline earth metal containing material was a chrysotile mining residue coming from the region of Thetford Mines directly from the exit of the residue conveyor. The chrysotile residue was crushed and grinded to a mini-particle size of about 50 microns. The reaction took place in a minibench top reactor 4560 of Parr Instrument Company. After the reaction, the gas was sampled in a Tedlar Bags of 3.8 L equipped with an on/off valve. The carbon dioxide concentration in the outlet gas was measured with a $CO_2$, Quantek Instruments, model 906.

The optimization of different parameters that can have significant influence on direct dry gas-solid carbonation was performed in both conventional single variable at a time method and with the statistical response surface methodology.

Optimization of Parameters Using a Conventional Single Variable Method

A series of experiments was carried out to optimize the most suitable conditions for direct dry gas-solid carbonation with conventional single variable variation at a time. The carbonation performance at different temperatures and pressures was optimized on the basis of percentage of $CO_2$ removal (dependent variable). Optimized conditions were evaluated for raw, non magnetic (Non-Mag) and heat treated samples. The optimized conditions for each type of sample were given in Table 5.

TABLE 5

Optimized conditions for direct dry gas-solid carbonation with different type of samples

| Sample type | Sample size (g) | Heat-treatment (° C., min) | Temperature (° C.) | Pressure (atm) | Time (h) | Average $CO_2$ removal (%) |
|---|---|---|---|---|---|---|
| Raw | 25 | No | 200 | 5 | 6 | 27.7 ± 0.6 |
| Non-Mag | 25 | No | 200 | 5 | 6 | 28.9 ± 0.6 |
| Raw | 25 | 630, 30 | 200 | 5 | 6 | 36.8 ± 2.4 |

The operating conditions for direct dry carbonation were optimized at 5 atm pressure and 200° C. temperature for 6 h duration. A maximum $CO_2$ removal of 36.8% was obtained with raw heat treated (at 630° C. for 30 min and grinded) sample.

Optimization of Parameters Using a Box-Behnken Design

The independent variable selected are temperature (X1), pressure (X2) and time (X3) and the independent response variable selected are $CO_2$ removal, Y1(%) and pressure variation, Y2 (kPa). Since the removal $CO_2$ is the key factor in this experiment, the present study focused on the percentage removal of $CO_2$. So, the percentage of $CO_2$ removal was chosen as the major response surface in this model. Heat treated (630° C. for 30 min) sample of 25 g was used for all runs.

TABLE 4

Amount of $CO_2$ treated (g$CO_2$), efficiency of the $CO_2$ removal and Mg lixiviation over 12 batches of 15 min.

| | Batch 1 | Batch 2 | Batch 3 | Batch 4 | Batch 5 | Batch 6 | Batch 7 | Batch 8 | Batch 9 | Batch 10 | Batch 11 | Batch 12 | Cumulative |
|---|---|---|---|---|---|---|---|---|---|---|---|---|---|
| Gas treated | 0.68 | 0.69 | 0.67 | 0.61 | 0.56 | 0.41 | 0.44 | 0.59 | 0.53 | 0.42 | 0.27 | 0.29 | 6.14 g$CO_2$ |
| Efficiency | 86% | 87% | 87% | 77% | 72% | 51% | 75% | 65% | 53% | 34% | 37% | 21% | 62% |
| Mg lixiviated | | 14% | | 14% | | 11% | | 15% | | 7% | | 4% | 64% |

Figure 10:
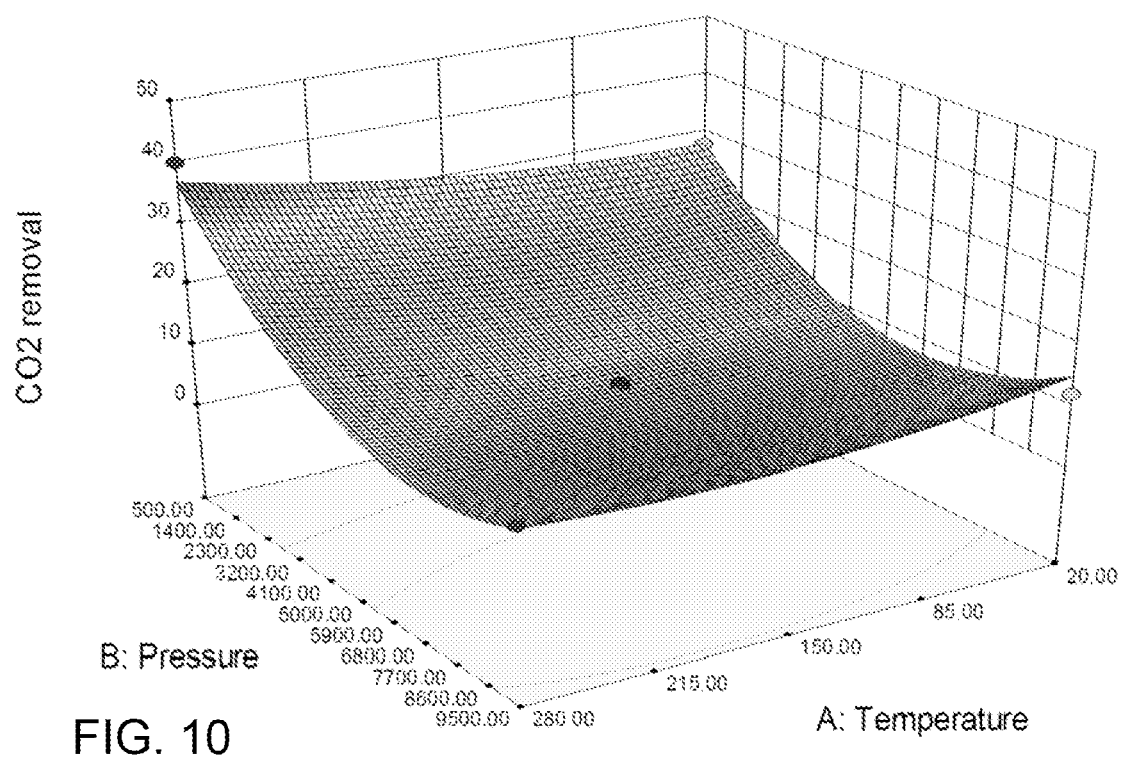
FIG. 10 is a response surface graph showing the interaction of temperature and pressure on $CO_2$ removal percentage in direct dry gas solid carbonation.

FIG. 10 shows the response surface graph for $CO_2$ removal (%) and from the figure it is clear that the $CO_2$ removal (%) is at its maximum at low pressure and higher temperature region. The optimal conditions and validation of optimized value are presented in Table 6. The variance analysis of the quadratic regression parameter for the predicted response surface of $CO_2$ removal (%) was analyzed by ANOVA.

The Model F-value of 30.56 and low probability value "Prob>F" less than 0.050 implies the model is significant. The value of multiple regression coefficients ($R^2$=0.9752) shows that only 2.5% of the total variation could not be explained by the empirical model. This model could explain 97.5% of the variability of response. The $R^2$ (0.9752) for $CO_2$ removal (%) was found in reasonable agreement with the adjusted $R^2$ value (0.9433). The predicted $R^2$ (0.70) was in reasonable agreement with adjusted $R^2$.

The optimized conditions for direct dry gas-solid carbonation by using Box-Behnken design was obtained at 258° C., 5.6 atm for 310 min. A $CO_2$ removal of 40.1% was predicted at the above conditions.

The validation of the model shows a $CO_2$ removal of 37%, which is close to the predicted value.

TABLE 6

Validation experiments of the response surface model (RSM)

| Experiments (No.) | Temperature (° C.) | Pressure (atm) | Time (min) | $CO_2$ removal (%) |
|---|---|---|---|---|
| RSM Model | 258* | 5.53* | 310* | 40.1** |
| A | 258 | 5.53 | 310 | 37.9 |
| B | 258 | 5.53 | 310 | 36.2 |
| C | 258 | 5.53 | 310 | 37.4 |
| Average | | | | 37.1 ± 0.8 |

*Optimum values of variables selected by the model.
**Predicted values for each response according to the model.

Carbonation studies were also conducted with raw and non magnetic sample at optimized conditions obtained from response surface methodology. The experiments and results are given in Table 7 and it shows that in optimized conditions, the $CO_2$ removal (%) for three type of samples are in close range. This indicates that the pre-treatment of sample does not make any significant effect in $CO_2$ removal (%).

TABLE 7

Experimental conditions and results for direct dry gas-solid carbonation of different type of samples at optimized conditions established by response surface methodology

| Sample type | Temperature (° C.) | Pressure (atm) | Time (min) | $CO_2$ removal (%) |
|---|---|---|---|---|
| Raw | 258 | 3.95 | 310 | 35.7 ± 1.1 |
| Non-Mag | 258 | 2.96 | 310 | 35.7 |
| Heat treated | 258 | 1.97 | 310 | 37.1 ± 0.8 |

Since time duration for carbonation in optimized conditions seems to be very long 310 min, carbonation assays were carried out for shorter reaction time to verify the time dependency of the rate of dry carbonation. The experiments and results are presented in Table 8.

TABLE 8

Experimental conditions and results for direct dry carbonation of raw sample at optimized temperature and pressure for 15 min duration

| Run | Temperature (° C.) | Pressure (atm) | Time (min) | $CO_2$ removal (%) |
|---|---|---|---|---|
| A | 258 | 3.95 | 15 | 36.3 |
| B | 258 | 2.96 | 15 | 39.0 |
| C | 258 | 1.97 | 15 | 33.5 |
| Average | | | | 36.3 ± 2.7 |

Figure 11:
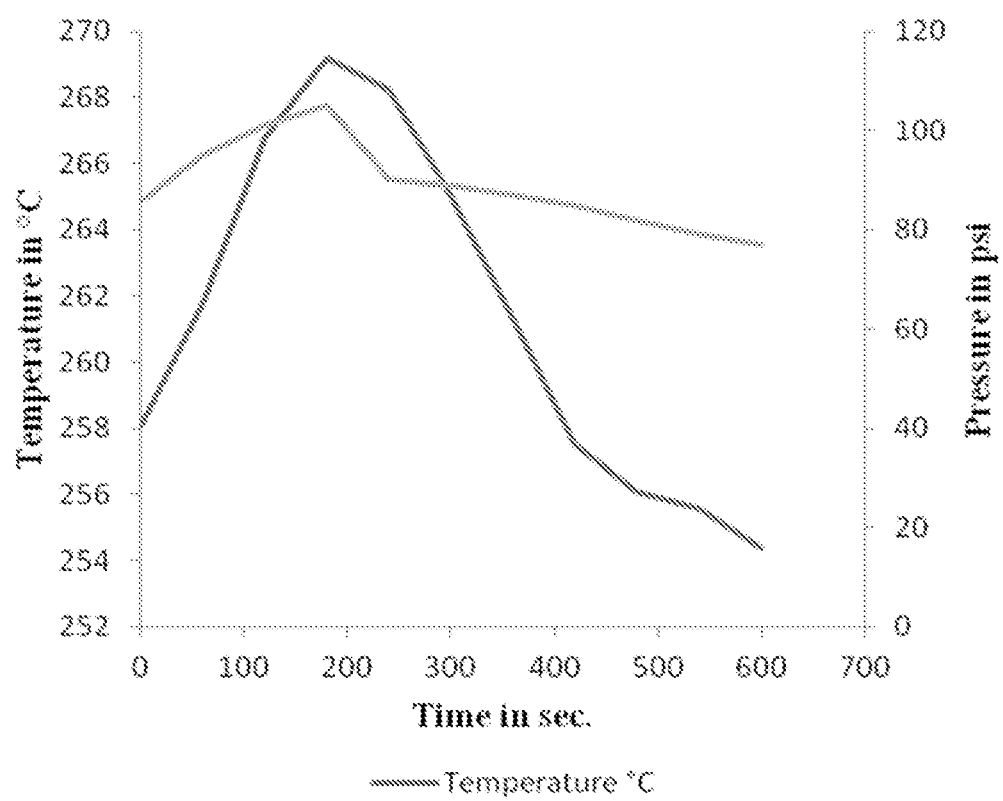
FIG. 11 is a pressure versus time graph of gas/solid carbonation at a temperature of 258° C., and a pressure of 5.6 atm over 10 minutes.

From the results, it was found that the major percentage of reaction occurs during the initial stage of carbonation reaction. The reaction achieved about 36% of $CO_2$ removal at 258° C., 5.53 atm within 15 min. This would suggest that major percentage of carbonation takes place within a time limit after which the reaction might become less important. The pressure variation curve given in FIG. 11 supports the above statement. The sudden decrease in pressure at the initial minutes indicates that the reaction occur fast at initial and then the decrease in pressure becoming very slow or constant indicates the carbonation occur very slow or attained equilibrium. The increase in pressure and temperature right after the addition of the $CO_2$ gas mixture might be due to the exothermic character of the reaction. The decrease in rate of reaction after certain time might be due to the formation of product layer, which might further hinder the inward diffusion of $CO_2$ and outward diffusion of water. The lesser surface renewal rate could also diminish the rate of carbonation, which could be increased by increasing the rate of particle attrition and abrasion through well mixing.

Experimentation 8—Comparison of $CO_2$ Removal Efficiencies

Experiments have been performed to compare the $CO_2$ removal efficiency for wet and dry carbonation of various alkaline earth metal containing materials.

Results for wet carbonation are shown in Table 9 and results for dry carbonation are shown in Table 10.

TABLE 9

Wet carbonation of 150 g/L of solid during 15 minutes at ambient temperature, P = 10.5 bars

| Sample/Test | Thermal pretreatment | Average $CO_2$ input (g) | Average $CO_2$ output(g) | Average % CO2 uptake | Std |
|---|---|---|---|---|---|
| Bignel Stone-pit (St urbain)-Anorthosite | no | 0.78 | 0.52 | 34.51 | 2.47 |
| Bouchard stone-pit (St Urbain)-Anorthosite | no | 0.78 | 0.43 | 44.37 | 10.18 |
| Old Gen. electrique stone-pit (St Urbain)-Anorthosite | no | 0.76 | 0.45 | 40.51 | 15.49 |
| andesine (BML Charlesbourg stone-pit) | no | 0.78 | 0.47 | 39.77 | 7.66 |
| concrete brick | no | 0.76 | 0.34 | 55.64 | 11.85 |
| concrete with aggregates | no | 0.79 | 0.29 | 63.41 | 2.59 |
| concrete | no | 0.78 | 0.17 | 78.44 | 1.21 |
| steelmaking slag | no | 0.76 | 0.12 | 84.51 | 4.23 |
| Red brick | no | 0.78 | 0.43 | 44.71 | 9.60 |
| Antigorite (Thetford Mines stone-pit) | yes | 0.78 | 0.32 | 58.89 | 2.94 |
| sandstone (Montmagny stone-pit) | no | 0.79 | 0.40 | 49.35 | 2.47 |
| worn MgO brick (steelmaking) | no | 0.77 | 0.43 | 44.62 | 2.23 |
| Wollastonite (Black Lake stone-pit) | no | 0.78 | 0.46 | 40.80 | 2.04 |
| olivine sand | no | 0.77 | 0.47 | 38.78 | 1.94 |
| Granite (Aguanish stone-pit) | no | 0.77 | 0.49 | 37.06 | 1.85 |
| Magnesium rich Basalt (St Joseph de Beauce stone-pit) | no | 0.80 | 0.54 | 32.90 | 1.64 |

TABLE 9-continued

Wet carbonation of 150 g/L of solid during 15 minutes at ambient temperature, P = 10.5 bars

| Sample/Test | Thermal pretreatment | Average $CO_2$ input (g) | Average $CO_2$ output(g) | Average % $CO_2$ uptake | Std |
|---|---|---|---|---|---|
| Calcium rich Basalt RayCar (St Flavie stone-pit) | no | 0.77 | 0.55 | 28.68 | 1.43 |
| Granite (Aguanish stone-pit) | yes | 0.77 | 0.57 | 25.12 | 1.26 |
| CaO Rotary kiln dust | no | 0.77 | 0.04 | 95.38 | 4.77 |
| MgO Rotary kiln dust | no | 0.75 | 0.05 | 93.20 | 4.66 |

TABLE 10

Dry carbonation of 1.5 g of solid during 30 minutes at T = 258° C., P = 4 bars

| Sample Test | Thermal pretreatment | Average $CO_2$ input (g) | Average $CO_2$ output (g) | Average $CO_2$ utpake (%) | Std |
|---|---|---|---|---|---|
| Bignel Stone-pit (St urbain) - Anorthosite | no | 0.17 | 0.09 | 43.37 | 6.74 |
| concrete | no | 0.16 | 0.02 | 74.83 | 1.58 |
| concrete brick | no | 0.17 | 0.04 | 74.79 | 6.63 |
| concrete with aggregates | no | 0.16 | 0.07 | 58.03 | 4.66 |
| Bouchard stone-pit (St Urbain)-Anorthosite | no | 0.17 | 0.09 | 46.98 | 5.44 |
| Old Gen. Electrique (St Urbain) | no | 0.18 | 0.03 | 81.14 | 2.95 |
| Andesine (BML Charlesbourg stone-pit | no | 0.17 | 0.10 | 39.90 | 10.30 |
| Red brick | no | 0.18 | 0.10 | 41.07 | 12.56 |
| steelmaking slag | no | 0.18 | 0.09 | 47.18 | 16.72 |
| worn MgO brick (steelmaking) | no | 0.18 | 0.05 | 70.67 | 0.40 |
| CaO Rotary kiln dust | no | 0.16 | 0.10 | 37.99 | |
| sandstone (Montmagny stone-pit) | no | 0.22 | 0.14 | 34.08 | 0.78 |
| Calcium rich Basalt RayCar (St Flavie stone-pit) | no | 0.22 | 0.13 | 38.75 | 1.92 |
| Magnesium rich Basalt (St Joseph de Beauce stone-pit) | no | 0.22 | 0.13 | 40.38 | 0.39 |
| Granite (Aguanish stone-pit) | no | 0.22 | 0.13 | 40.10 | 0.78 |
| Granite (Aguanish stone-pit) | yes | 0.22 | 0.13 | 41.48 | 1.95 |
| olivine sand | no | 0.22 | 0.12 | 43.13 | 1.17 |
| Wollastonite (Black Lake stone-pit) | no | 0.22 | 0.12 | 43.13 | 1.17 |

TABLE 10-continued

Dry carbonation of 1.5 g of solid during 30 minutes at T = 258° C., P = 4 bars

| Sample Test | Thermal pretreatment | Average $CO_2$ input (g) | Average $CO_2$ output (g) | Average $CO_2$ utpake (%) | Std |
|---|---|---|---|---|---|
| Antigorite (Thetford Mines stone-pit) | yes | 0.22 | 0.13 | 42.31 | 0.78 |
| Serpentinite (Black Lake) | no | 0.22 | 0.13 | 42.05 | 5.07 |
| Serpentinite (Black Lake) | yes | 0.22 | 0.14 | 23.2 | 5.82 |
| MgO Rotary kiln dust | no | 0.22 | 0.14 | 37.34 | |

Experimentation 8: Magnesia Production

The following results illustrate benefits of the magnesia production process described herein compared to a conventional process. The following data were obtained based on technical simulations performed using experimental data obtained with the serpentinite carbonation process. Assumption of a zero $CO_2$ loss from the overall $MgCO_3$ calcination process was made. Calcination $CO_2$ by-product emissions were calculated based on the total process energy demand (carbonation+calcination=1 139 kWh/tsolid) and using equation 1 stoichiometry. $CO_2$ equivalent emissions (from other greenhouse gases gases) were not considered and $CO_2$ emissions were accounted as they stand for the major emissions in the present scheme.

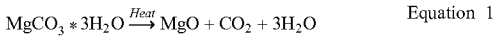
$$MgCO_3 * 3H_2O \xrightarrow{Heat} MgO + CO_2 + 3H_2O \qquad \text{Equation 1}$$

Based on the case 2, production of 179 000tMgO per year allows treatment of 184 000t$CO_2$ from an industrial emitter and can result in 87 000t$CO_2$ emissions. In comparison, a similar MgO production following a conventional process would produce 263 000t$CO_2$. Thus, the $CO_2$ emissions reduction is 176 000t$CO_2$, (263 000-87 000) giving a total economy of 360 000t$CO_2$ (176 000+184 000) per year.

Determination 9—Emissions Comparison $CO_2$ emissions resulting from an $MgCO_3$ calcination process can include between 10% and 23% $CO_2$. With techniques described herein that use Mg silicates for producing $MgCO_3$ from flue gas (e.g., 18.2% $CO_2$), applicability with MgO production related $CO_2$ emissions as described is confirmed. For example, the calcination emissions can include similar $CO_2$ content compared to flue gas, and thus the carbonation step can utilise both flue gas and calcination emissions as a source of $CO_2$ with adequate consistency for operational performance.

Experimentation 10—Carbonates Calcination

This relates to the calcination of nesquehonite ($MgCO_3 \cdot 3H_2O$) produced from techniques described herein into magnesia (MgO) at 950° C. $MgCO_3 \cdot 3H_2O$ was produced during the precipitation step (step 32). Experiments were conducted in an electric heated laboratory scale rotary kiln. The kiln had an internal diameter and length of 44.45, and 1000 mm, respectively. Calcination was realized by heating 5.0 g of material feed at constant rate of 0.18 g/min. A control panel set speed of the kiln at 3 rpm. The mass loss, caused by heating was 68%. This highlighted the Nesquehonite decomposition onto MgO with the loss of $CO_2$ and $H_2O$.

The invention claimed is:

1. A process for producing magnesia, comprising:
producing magnesium carbonate from a magnesium silicate material, including:
subjecting the magnesium silicate material to dehydroxylation to produce a magnesium-containing material, and
contacting a $CO_2$-containing gas with the magnesium-containing material; and
subjecting the magnesium carbonate to calcination to produce magnesia;
wherein producing the magnesium carbonate further includes:
recycling at least a portion of the $CO_2$ by-product as a recycled $CO_2$ by-product;
recycling $CO_2$ derived from the dehydroxylation as at least part of the $CO_2$-containing gas; and
contacting the magnesium-containing material with the recycled $CO_2$ by-product and the $CO_2$-containing gas.

2. The process of claim 1, wherein producing the magnesium carbonate further comprises providing the magnesium-containing material in an aqueous slurry and contacting the $CO_2$-containing gas and the recycled $CO_2$ by-product with the aqueous slurry.

3. The process of claim 2, further comprising:
in the contacting step, producing a carbonate loaded slurry comprising precipitable carbonates and substantially free of precipitated alkaline earth metal carbonates;
separating the carbonate loaded slurry into an aqueous phase comprising the precipitable carbonates and a solid phase;
precipitating the magnesium carbonates from the aqueous phase; and
separating the magnesium carbonates from the aqueous phase.

4. The process of claim 1, wherein the $CO_2$-containing gas further comprises $CO_2$-containing emissions that are directly used as they are produced from a plant.

5. The process of claim 4, wherein the $CO_2$-containing emissions comprise emissions from a separate emission source.

6. The process of claim 1, wherein the $CO_2$ containing gas further comprises $CO_2$ derived from an additional magnesia production train.

7. The process of claim 1, wherein the magnesium silicate material comprises at least one of basalt, peridotite, serpentinized peridotite, ophiolitic rock, mafic rock, ultramafic rocks, peridot, pyroxene, olivine, serpentine, and serpentinite.

8. The process of claim 1, wherein the magnesium-containing material is pre-treated to produce magnesium-containing particulate material prior to carbonation, and the magnesium-containing particulate material has a magnesium content between about 1 wt % and about 35 wt %.

9. The process of claim 8, wherein the magnesium content is between about 10 wt % and about 30 wt %.

10. The process of claim 1, wherein the magnesium-containing material is derived from a mining residue comprising phyllosilicate mining residue and/or chrysotile mining residue.

11. The process of claim 1, further comprising:
subjecting the magnesium-containing material to size reduction and removal of a magnetic fraction prior to carbonation.

12. The process of claim 1, further comprising:
grinding a starting material to provide a particle size between about 200 microns and about 1000 microns to produce a sized material;
removing the magnetic fraction from the sized material to produce a non-magnetic fraction; and
grinding the non-magnetic fraction to produce the magnesium-containing material having a particle size of at most 75 microns.

13. The process of claim 1, wherein the $CO_2$ content of the recycled $CO_2$ by-product is at least 10% greater than that of the $CO_2$-containing gas.

14. The process of claim 13, wherein the $CO_2$ content of the recycled $CO_2$ by-product is at least 20% greater than that of the $CO_2$-containing gas.

15. The process of claim 14, wherein the $CO_2$ content of the recycled $CO_2$ by-product is at least 50% greater than that of the $CO_2$-containing gas.

16. The process of claim 1, wherein the dehydroxylation is performed at a temperature from 600 to 700 degrees Celsius.

17. The process of claim 1, wherein the dehydroxylation is performed for a duration of approximately 20 to 60 minutes.

18. The process of claim 1, wherein the magnesium silicate material is a phyllosilicate.

19. The process of claim 18, wherein the magnesium silicate material comprises serpentine.

* * * * *